United States Patent [19]
Asami et al.

[11] Patent Number: 4,722,546
[45] Date of Patent: * Feb. 2, 1988

[54] REAR SUSPENSION CONTROLLER

[75] Inventors: Ken Asami, Nagoya; Kaoru Ohashi, Okazaki; Toshio Onuma, Susono; Shuuichi Buma, Toyota, all of Japan

[73] Assignee: Toyota Jidosha Kabushiki Kaisha, Japan

[*] Notice: The portion of the term of this patent subsequent to Mar. 3, 2004 has been disclaimed.

[21] Appl. No.: 815,817

[22] Filed: Jan. 2, 1986

[30] Foreign Application Priority Data

Jan. 18, 1985 [JP] Japan ............................ 60-7957
Jan. 23, 1985 [JP] Japan ............................ 60-11359

[51] Int. Cl.$^4$ .......................................... B60G 17/00
[52] U.S. Cl. .................................................. 280/707
[58] Field of Search ............. 280/707, 708, 709, 711, 280/714, DIG. 1, 6 R, 6 H

[56] References Cited

U.S. PATENT DOCUMENTS

| | | | |
|---|---|---|---|
| 2,973,969 | 3/1961 | Thall | 280/709 |
| 3,632,131 | 1/1972 | Engfer | 280/707 |
| 3,884,496 | 5/1975 | Ito et al. | 280/708 |
| 4,162,083 | 7/1979 | Zabler | 280/703 |
| 4,540,188 | 9/1985 | Meloche et al. | 280/6 R |
| 4,600,215 | 7/1986 | Kuroki et al. | 280/707 |

FOREIGN PATENT DOCUMENTS

| | | |
|---|---|---|
| 56-31861 | 3/1981 | Japan . |
| 58-30542 | 2/1983 | Japan . |
| 59-23712 | 2/1984 | Japan . |
| 59-26638 | 2/1984 | Japan . |
| 59-63218 | 4/1984 | Japan . |

OTHER PUBLICATIONS

Technical Paper (840,258), Mizuguchi, M., *Chassis Electronic Control Systems for the Mitsubishi 1984 Galant*, Society of Automotive Engineers, 3184, 280-707.

Primary Examiner—John J. Love
Assistant Examiner—Karin L. Ferriter
Attorney, Agent, or Firm—Parkhurst & Oliff

[57] ABSTRACT

A rear suspension controller for controlling the suspension characteristic of a vehicle having a suspension which supports a vehicle body on plural wheels, wherein the acceleration of the vertical movement of at least one of the front wheels is measured and a corresponding signal is produced for detecting sporadic irregularities on a road surface. This acceleration signal is compared against preset reference signals and the characteristic of the rear suspension is altered, e.g., the suspension is made harder or softer, in dependence on the comparison in order to keep the controllability and stability or to maintain a good ride comfort according to demand. Additionally, the preset reference signals themselves are changed depending upon the vehicle speed because the influence of the shock caused by the irregularities changes according to the vehicle speed.

4 Claims, 41 Drawing Figures

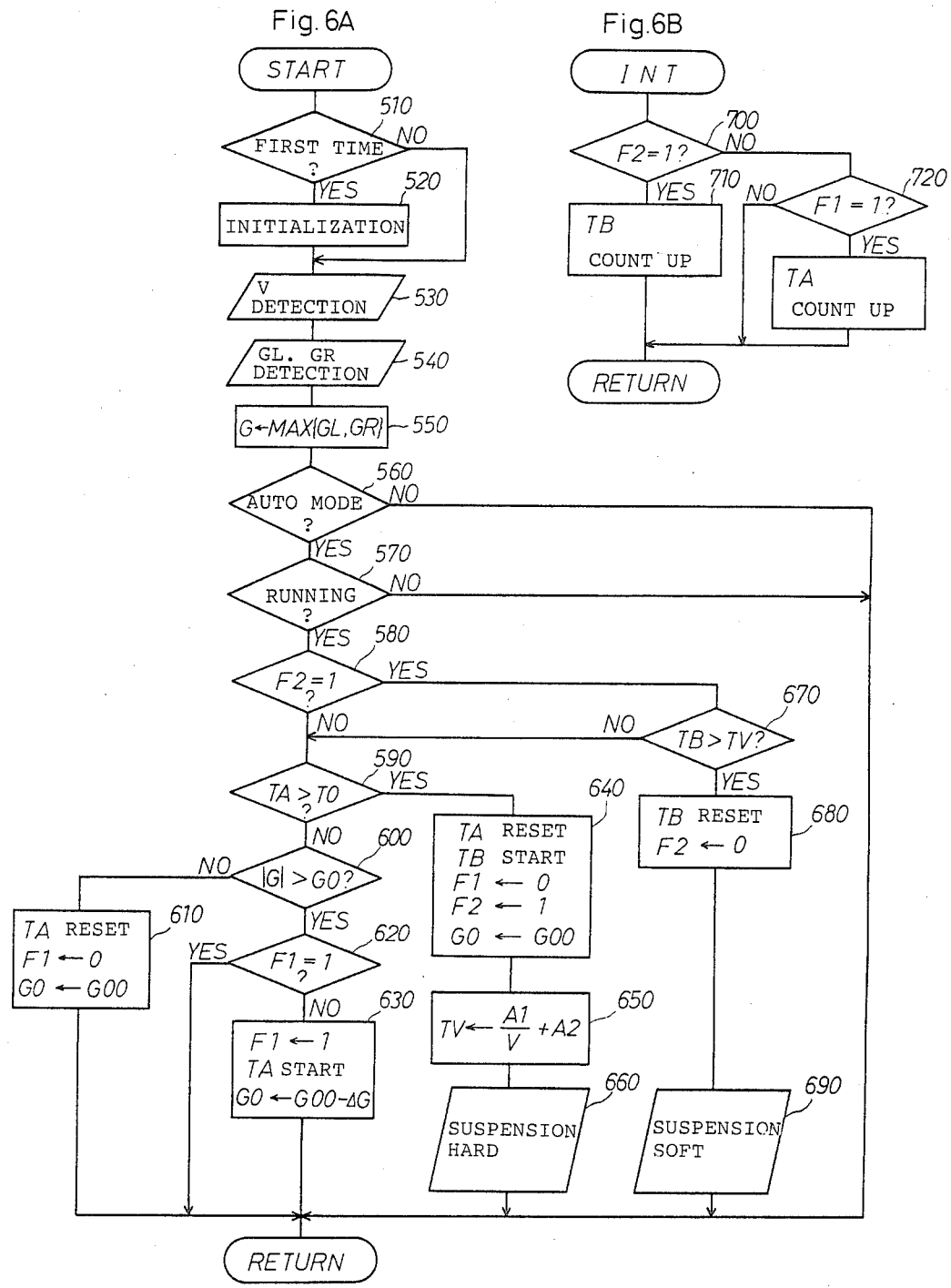

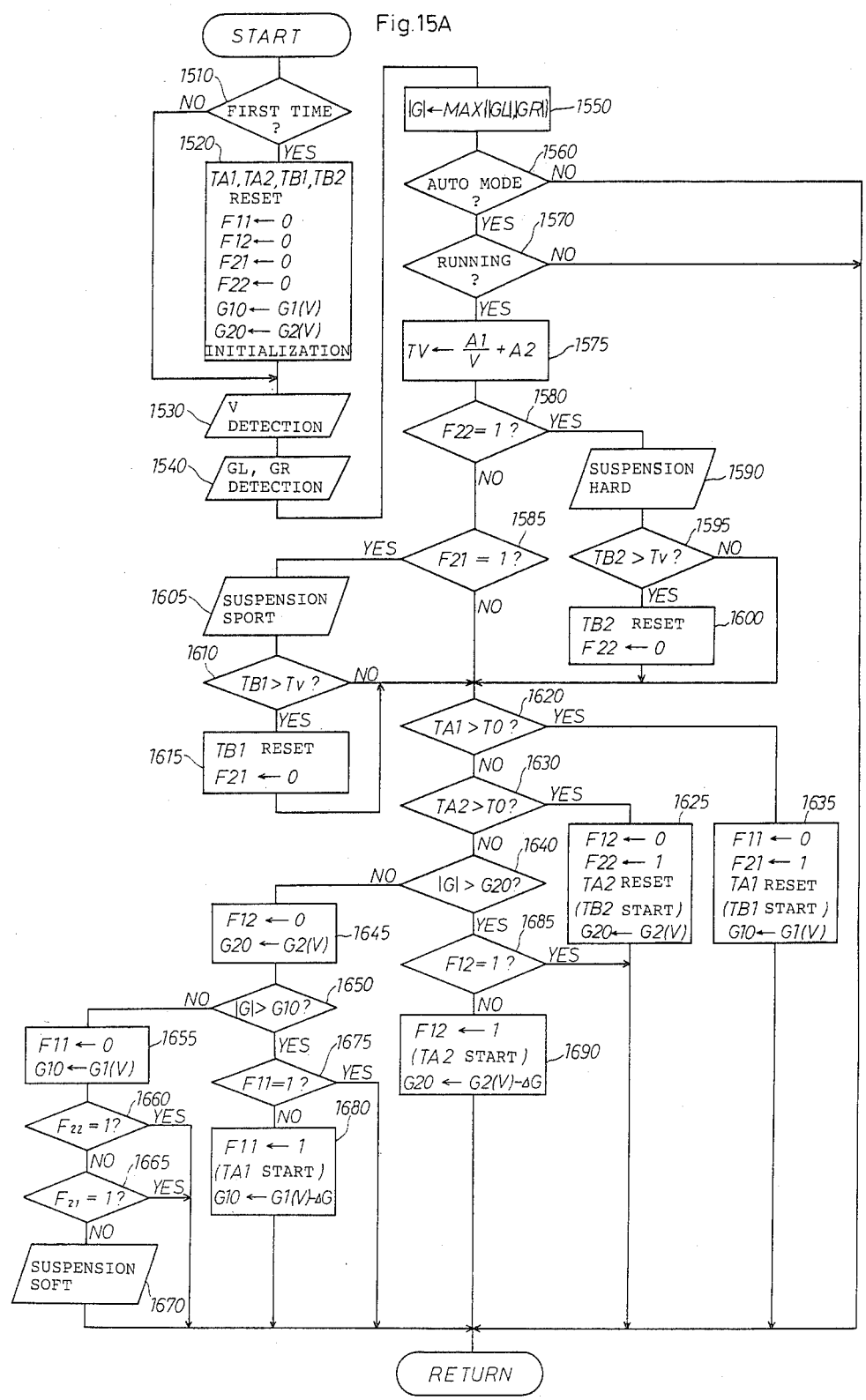

REAR SUSPENSION CONTROLLER

BACKGROUND OF THE INVENTION

1. Field of the Invention

The present invention relates to a rear suspension controller for a vehicle, particularly to a rear suspension controller which is effective against a sporadic shock caused by a bump or dip of a road surface on which the vehicle is running.

2. Prior Art

Conventionally, the spring constant, damping force, bush characteristic or stabilizer characteristic of each of various suspension components provided between a body of a vehicle and its wheels is altered under control depending on conditions of a road surface or running conditions of the vehicle in order to prevent the vehicle from being shocked or vibrated and keep the controllability and stability of the vehicle good. For example, altering the spring constant of air springs of the suspensions depending on conditions of the road surface was proposed in the published unexamined Japanese patent applications No. Sho 59-23712 and No. Sho 59-26638, altering the damping force of shock absorbers in the published unexamined Japanese patent appications No. Sho 58-30542 and No. Sho 59-23712 and altering the stiffness of bushes or a stabilizer in the Japanese utility model application No. Sho 58-26605 and in the published unexamined Japanese utility model application No. Sho 59-129613. In such control, when it is detected by a vehicle height sensor that the vehicle is running on a rough road or when it is detected by a brake sensor or an accelerator sensor that the front of the vehicle is going to rise up or sink down, the characteristic of each suspension of the vehicle is altered to maintain a good controllability and stability of the vehicle running on the rough road, or to prevent the front of the vehicle from rising up or sinking down further. However, under the above-mentioned conventional control, the vehicle is notjudged to be running on a rough road until large irregularities are consecutively detected by the vehicle height sensor. When the vehicle is judged to be running on a rough road, the spring constants of the suspensions for all the wheels of the vehicle or the damping forces of the shock absorbers for all the wheels are increased to produce a desired effect. If the vehicle passes over a joint of road patches or its sporadic bump or dip, the vehicle usually receives only one shock and resumes running on a flat part of the road again, so that the characteristic of each suspension is not altered. For that reason, occupants of the vehicle are not protected from an unpleasant shock caused by such sporadic bump or dip, which is different from the case that the vehicle is running on a rough road having consecutive bumps or dips. In some cases of passing over such a sporadic bump or dip, the controllability and the stability of the vehicle deteriorate as well.

SUMMARY OF THE INVENTION

Accordingly one object of this invention is to provide a novel rear suspension controller which appropriately control rear suspensions provided between a body of a vehicle and its rear wheels, to keep the controllability and stability of the vehicle good and to provide occupants of the vehicle with a good feel of ride.

The second object of the invention is to alter the characteristic of the rear suspensions of a vehicle running over such a sporadic bump or dip of the road surface like a joint of road patches to keep the controllability and stability of the vehicle and the feel of ride thereof good.

The third object of the invention is to alter the rear suspension characteristic as quick as possible to adequately cope with the shocks caused by the bump or dip.

The fourth object of the invention is to change the quality of control according to the vehicle speed in order to keep the controllability and stability good at any running speed.

The fifth and last object of the invention is to apply the above-mentioned control not only to one type of suspension but also to other various types of suspensions.

This and other objects are achieved according to the invention means as shown in FIG. 1, which is a schematic block diagram indicating the basic idea of the present invention. The novel rear suspension controller for a vehicle having a suspension between a body and a rear wheel of the vehicle includes:

a front wheel acceleration detection means (M2) for detecting an acceleration of a vertical movement of a front wheel and for generating an acceleration signal;

a judgment means (M3) for comparing the acceleration signal with a predetermined reference range and for generating a judgment result signal when the acceleration signal is out of the reference range; and a rear suspension characteristic alteration means (M5) for altering a suspension characteristic of the rear suspension in receiving the judgment result signal.

The rear suspension controller may further include:

a vehicle speed detection means (M6) for detecting a running speed of the vehicle and for generating a vehicle speed signal and a change means (M7) for changing the reference range used in the judgment means according to the vehicle speed signal.

The front wheel acceleration detection means (M2) is provided to, for example, a front axle and detects an acceleration of a vertical movement of the front wheel. The acceleration detection means (M2) sends an acceleration signal to the judgment means (M3) which compares the acceleration signal with a predetermined reference range. When the front wheel rides on a bump or sinks into a dip of a road surface, the acceleration detection means (M2) generates a corresponding acceleration signal and if the bump or dip is large enough that the acceleration signal goes out of the predetermined reference range, the judgment means (M3) generates a judgment result signal and sends it to a rear suspension characteristic alteration means (M5) in order for the rear suspension to appropriately cope with the bump or dip.

The rear suspension characteristic is altered by altering, for example, spring constant, damping force, bush stiffness, stabilizer stiffness, etc.

When the vehicle speed detection means (M6) and the change means (M7) are provided to the rear suspension controller, the reference range is changed depending on the vehicle speed. This reference range change control is advantageous because the quality of shock which the wheels receive differs depending on the running speed of the vehicle.

The rear suspension characteristic may be altered into a plurality of states according to the size of the bump or dip. A plurality of reference ranges are prepared in the judgment means for such a judgment.

BRIEF DESCRIPTION OF THE DRAWINGS

A more complete appreciation of the invention and many of the attendant advantages thereof will be readily obtained as the same becomes better understood by references to the following detailed description when considered in connection with the accompanying drawings.

FIG. 6A is a flowchart showing process steps which are performed by the ECU in the first embodiment. FIG. 6B is a flowchart showing process steps for interrupt counting routine.

FIG. 15A is a flowchart showing process steps which are performed by the ECU in the second embodiment.

DETAILED DESCRIPTION OF THE PREFERRED EMBODIMENTS

Figure 2:
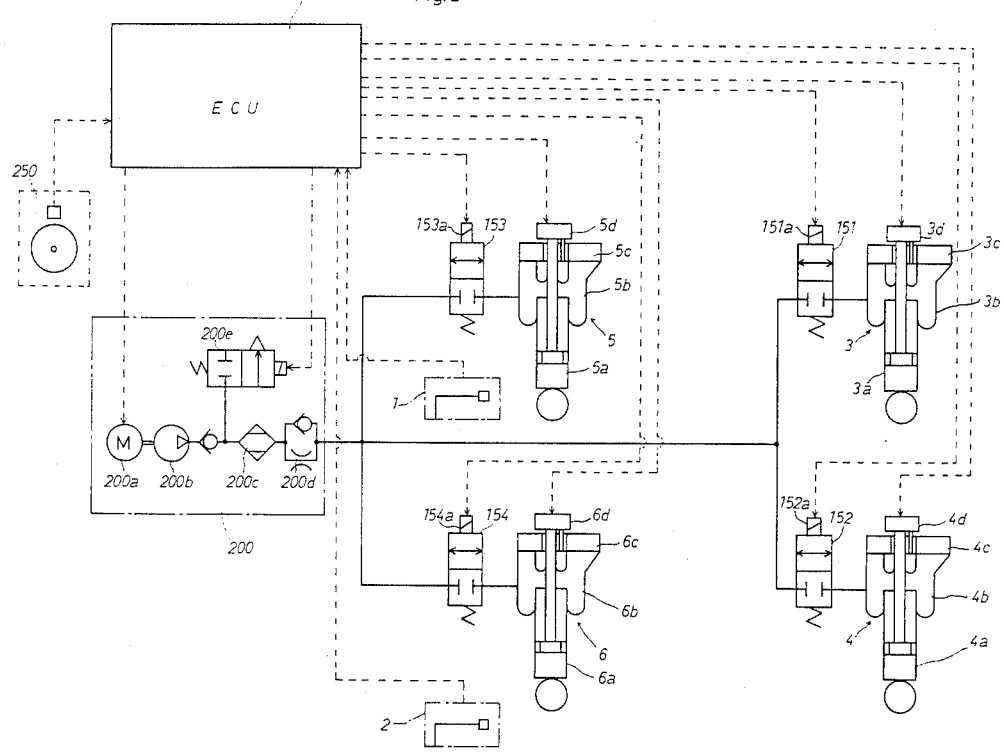
FIG. 2 is a system diagram showing an embodiment of the present invention.

Referring now to the drawings, wherein like reference numerals designate identical or corresponding parts throughout the several views, FIG. 2 shows preferred embodiment of the rear suspension controller according to the invention provided to an automobile having independent air suspensions. A right front wheel acceleration sensor 1 is provided on the right suspension arm of the automobile to detect an acceleration of the vertical movement of the right front wheel. A left front wheel acceleration sensor 2 is provided on the left suspension arm of the automobile to detect an acceleration of the vertical movement of the left front wheel. The acceleration sensors 1 and 2 are, for example, constructed as shown in FIGS. 3A, 3B and 3C.

Figure 3A:
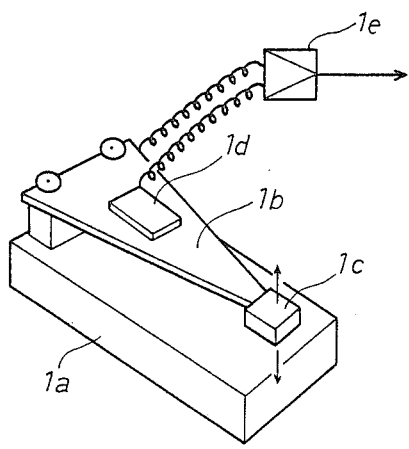
FIG. 3A is a perspective view of an acceleration sensor using a piezoelectric ceramic plate.
Figure 3B:
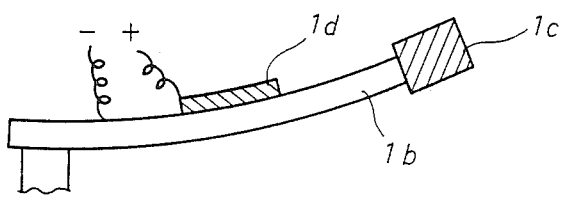
FIGS. 3B and 3C show two functioning states of the acceleration sensor.
Figure 3C:
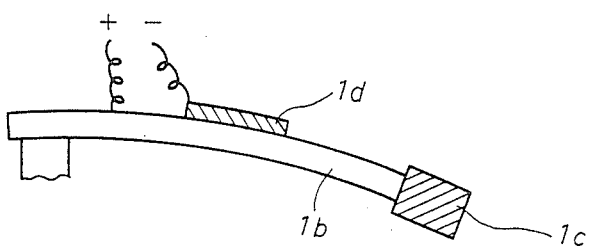

FIG. 3A shows a perspective view of an example of the front wheel acceleration sensors 1 and 2. Each sensor is constructed from: a base 1a which is made of a rigid body and is fixed to the measured object (a suspension arm); a resilient plate 1b which is fixed to the base 1a at one of the ends; a weight 1c attached to the other end of the resilient plate 1b; a piezoelectric ceramic plate 1d which is attached on a surface of the resilient plate 1b; and an amplifier 1e which amplifies the voltage signal generated by the piezoelectric ceramic plate 1d.

When an acceleration is exerted to the base 1a which is attached to a suspension arm member, the resilient plate 1b is bended by the inertia of the weight 1c and the piezoelectric ceramic plate 1d is distorted to generate a corresponding voltage. The voltage is amplified by the amplifier 1e and is output as an acceleration signal. When the direction of the front wheel acceleration is from the resilient plate 1b to the base 1a, the resilient plate 1b bends, as shown in FIG. 3B, with the piezoelectric ceramic plate 1d on the concave side and the piezoelectric ceramic plate 1d generates a corresponding voltage signal. When the acceleration is exerted to the opposite direction to the case above, as shown in FIG. 3C, the output signal corresponds to the direction. An acceleration of a vertical movement of the front wheel is thus detected.

The front wheel acceleration can be detected by, besides the apparatus as described above, one that uses strain gages to detect a distortion of a resilient plate caused by an acceleration or one that uses a semiconductor pressure sensor to detect a pressure exerted on the semiconductor by an acceleration. Other devices may be used of course.

The acceleration sensors 1 and 2 are attached to the front suspension arms in the above explained example, they may be attached on a front axle if the automobile is an axle suspension type.

FIG. 2 also shows an air suspension 3 which is provided between a suspension arm (not shown) for the right rear wheel of the automobile and the body thereof and extends in parallel with a suspension spring (not shown). The air suspension 3 primarily includes a shock absorber 3a, a main chamber 3b, an auxiliary air chamber 3c and an actuator 3d and has a spring function, a vehicle height adjustment function and a shock absorber function. The same air suspensions 4, 5 and 6 are provided for the left rear wheel, the right front wheel and the left front wheel of the vehicle, respectively.

Figure 4A:
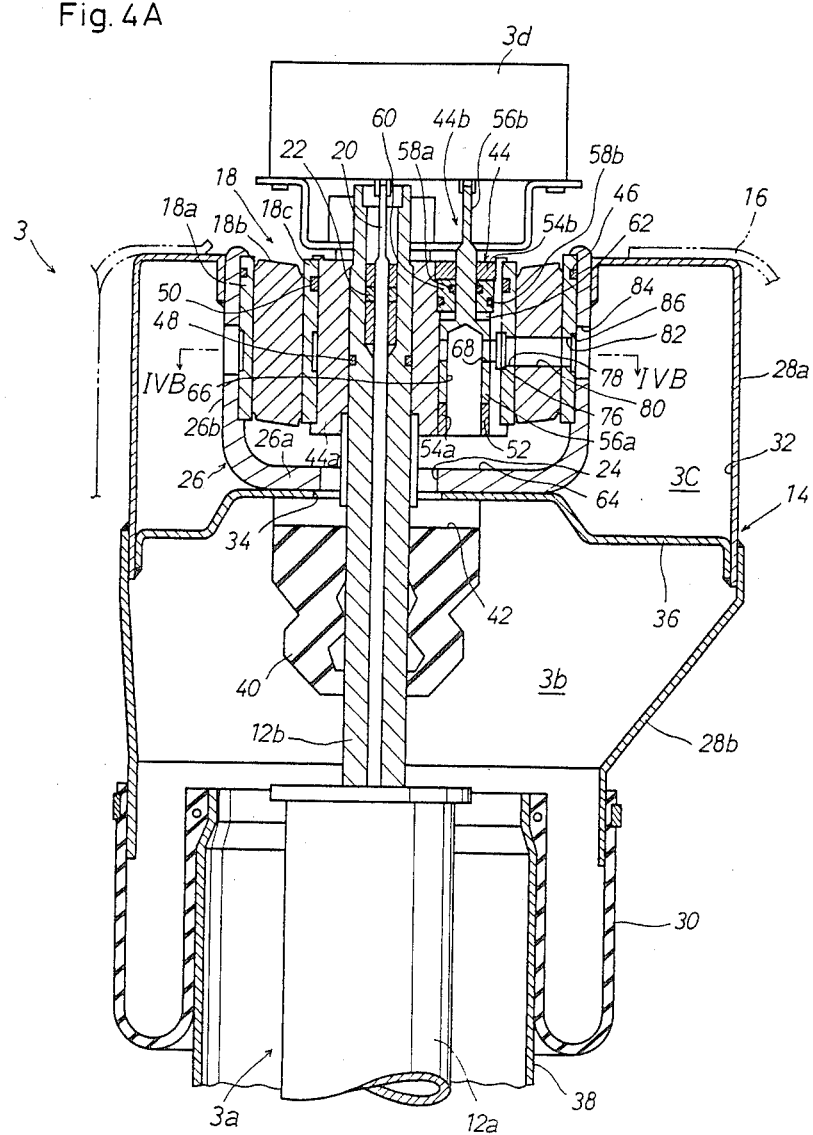
FIG. 4A is a sectional view of the main part of an air suspension to which the embodiments are applied.
Figure 4B:
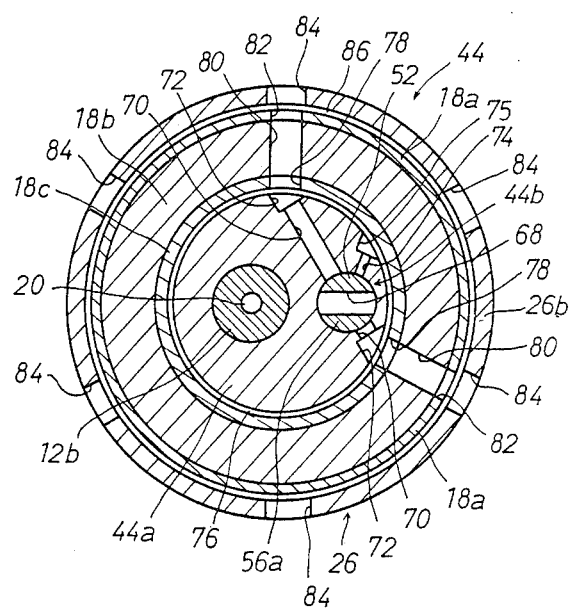
FIG. 4B is a cross sectional view along a line IVB—IVB shown in FIG. 4A.

FIGS. 4A and 4B show a system of the main part of the air suspension 3. FIG. 4B shows a cross sectional view along a line IVB—IVB shown in FIG. 4A. The other air suspensions 4, 5 and 6 have the same system as the suspension 3. The air suspension 3 includes a conventional shock absorber 3a composed of a piston and a cylinder 12a, and an air spring unit 14 provided in conjunction with the shock absorber. An axle (not shown) is supported at the lower end of the cylinder 12a of the shock absorber 3a. An elastic cylindrical assembly 18 for elastically supporting a piston rod 12b to the vehicle body 16 is provided at the upper end of the piston rod 12b extending from the piston (not shown) slidably fitted in the cylinder 12a. The shock absorber 3a is a conventional buffer whose damping force can be varied for adjustment by operating the valve function of the piston. A control rod 20 for adjusting the damping force is liquid-tightly and rotatably fitted with a sealing member 22 in the piston rod 12b.

The air spring unit 14 has a chamber 32 which is defined by a circumferential member 26 including a bottom 26a provided with an opening 24, through which the piston rod 12b is allowed to extend, and a wall 26b rising from the peripheral portion of the bottom 26a, an upper housing member 28a covering the circumferential member 26 and secured on the vehicle body, a lower housing member 28b open at the lower end and coupled to the lower end of the upper housing member 28a, and a diaphragm 30 made of an elastic material and closing the lower end of the lower housing member 28b. The chamber 32 is divided into a lower main air chamber 3b and an upper auxiliary air chamber 3c by a partition member 36 secured on the bottom 26a of the circumferential member 26 and having an opening 34 corresponding to the opening 24 provided in the bottom 26a. Both the chambers 3b and 3c are filled with compressed air. The partition member 36 is fitted with a conventional buffer rubber 40 which can be brought into contact with upper end of the cylinder 12a. The buffer rubber 40 has a passage 42 for connecting the openings 24 and 34 to the main air chamber 3b.

The elastic cylindrical assembly 18 is disposed inside the circumferential member 26 whose wall 26b defines the inside circumferential surface of the auxiliary air chamber 3c, in such manner that the assembly 18 surrounds the piston rod 12b. The cylindrical elastic assembly 18 is provided with a valve unit 44 for controlling the communication of both the air chambers 3b and 3c. The assembly 18 includes an outer cylinder 18a, a cylindrical elastic member 18b and an inner cylinder 18c which are disposed concentrically with respect to each other. The outer cylinder 18a is press-fitted on the wall 26b of the circumferential member 26 secured on the vehicle body, under the action of the upper housing member 28a. The valve casing 44a of the valve unit 44, through which the piston rod 12b is allowed to extend, is secured on the inner cylinder 18c. Since the piston rod 12b is secured on the valve casing 44a, the piston rod is elastically supported to the vehicle body by the cylindrical elastic assembly 18. An annular air sealing member 46 is tightly packed in between the outer cylinder 18a and the bottom 26b of the member 26. An annular air sealing member 48 is tightly packed in between the piston rod 12b and and the valve casing 44a. An annular air sealing member 50 is tightly packed in between the inner cylinder 18c and the valve casing 44a.

The valve casing 44a has a hole 52 which is open at both ends and extends in parallel with the piston rod 12b. A rotary valve 44b is rotatably supported in the hole 52. The valve 44b includes a main portion 56a, which can be brought into contact with a lower positioning ring 54a provided at the lower end of the hole 52, and a small-diameter operating portion 56b projecting from the main portion above the elastic cylindrical assembly 18. An upper positioning ring 54b, which cooperates with the lower positioning ring 54a to prevent the valve 44b from dropping out of the hole 52, is provided at the upper end of the hole 52. An annular sealing base 60 holding an inner air sealing member 58a and an outer air sealing member 58b for tightly closing the hole 52 is provided between the upper positioning ring 54b and the main portion 56a of the valve 44b. A friction reducer 62 for smoothing the rotative motion of the valve 44b when the main portion 56a of the valve is pushed to the sealing base 60 by air pressure is provided between the sealing base and the main portion of the valve.

A chamber 64, which communicates with the main air chamber 3b through the openings 24 and 34 and the passage 42 of the buffer rubber 40, is formed in the lower portion of the elastic cylindrical assembly 18. The main portion 56a of the valve 44b has a recess 66 open to the chamber 64, and has a communication passage 68 extending through the main portion 56a in a diametrical direction thereof across the recess 66.

The valve casing 44a, which houses the valve 44b, has a pair of air passages 70, each of which can communicate at one end with the communication passage 68, as shown in FIG. 4B. The air passages 70 extend on almost the same plane outwards in a diametrical direction of the hole 52, toward the peripheral surface of the valve 44b. The other end of each air passage 70 is open to the peripheral surface of the valve casing 44a through a face hole 72. An air passage 74, which can communicate with the communication passage 68, extends on almost the same place as the pair of air passages 70 toward the peripheral surface of the valve casing 44a, between the pair of air passages 70 outside the hole 52. The diameter of the air passage 74 is smaller than that of each of the air passages 70. The other end of the air passage 74 is open to the peripheral surface of the valve casing 44a through a face hole 75. The inside circumferential surface of the inner cylinder 18c covering the peripheral surface of the valve casing 44a has an annular recess 76 which surrounds the peripheral surface of the valve casing to connect the face holes 72 and 75 for the air passages 70 and 74 to each other.

The inner cylinder 18c has an opening 78 which extends continuously to the recess 76 which constitutes an annular air passage. The cylindrical elastic member 18b has through holes 80, which extend outwards in the radial direction of the member 18b correspondingly to the openings 78. The through holes 80 are made open to the peripheral surface of the outer cylinder 18a through the openings 82 of the cylinder so that the openings 78 and 82 and the through holes 80 define an air passage including the air passages 70 and extending through the elastic cylindrical assembly 18.

The peripheral surface of the wall 26b of the circumferential member 26 covering the outer cylinder 18a are provided with plural openings 84 which are located at equal intervals in the circumferential direction of the member 26 and extend continuously to the auxiliary air chamber 3c to connect the openings 78 and 82 and the through holes 80 to the auxiliary air chamber 3c. The peripheral surface of the outer cylinder 18a is provided with an annular recess 86 which surrounds the outer cylinder at the openings 82 to connect the openings 84, 78 and 82 and the through holes 80 to each other. The openings 84 extend continuously to the recess 86 constituting an annular air passage.

Although the openings 78 and 82 and the through holes 80 are provided correspondingly to the two air passages 70 of the valve casing 44a in the embodiment shown in FIG. 4B, the air passages 70 and 74 can be provided in optional positions in the circumferential direction of the elastic member 18b because the annular air passage 76, with which the air passages 70 and 74 communicate, is formed between the inner cylinder 18c and the valve casing 44a.

A control rod 20 for adjusting the damping force of the shock absorber 3a, and a conventional actuator 3d for rotating the valve 44b of the valve unit 44, are provided at the upper end of the piston rod 12b, as shown in FIG. 4A.

Since the air suspension 3 has the above-mentioned system, the air suspension performs actions described hereinafter. When the valve 44b is in a closed position, as shown in FIG. 4B, that the communication passage 68 of the valve does not communicate with any of the air passages 70 and 74 of the valve casing 44a, the main air chamber 3b and the auxiliary air chamber 3c are discommunicated from each other so that the spring constant of the suspension 3 is set at a great value. When the actuator 3d has rotated the valve 44b into such a position that the communication passage 68 of the valve communicates with the large-diameter air passages 70 of the valve casing 44a, the main air chamber 3b is communicated with the auxiliary air chamber 3c through the communication passage 68, the large-diameter air passages 70 and the openings 78 and through holes 80 of the elastic assembly 18 and the openings 82 and 84, so that the spring constant of the suspension 3 is set at a small value. When the valve 44b is rotated into such a position by the regulated actuator 3d that the communication passage 68 of the valve communicates with the small-diameter communication passage 74 of the valve casing 44a, the main air chamber 3b is communicated with the auxiliary air chamber 3c through the communication passage 68, the small-diameter air passage 74, the air passage 76, the openings 78 and through holes 80 of the elastic assembly 18 and the openings 82 and 84, so that the spring constant of the suspension 3 is set at an intermediate value because the small-diameter air passage 74 provides a higher air flow resistance than the large-diameter air passages 70.

Leveling valves 151 through 154 are provided for the rear air suspensions 3 through 6, respectively, as shown in FIG. 2. A compressed air feed and discharge system 200, which is described below, is connected to or disconnected from the main air chambers 3b through 6b of the air suspensions 3 through 6 by the leveling valves 151 through 154 depending on whether or not electricity is supplied to solenoids 151a through 154a. When the leveling valves 151 through 154 are opened, compressed air is fed to the air suspensions, the height of the automobile is increased. If the compressed air is discharged from the air suspensions, the height of the automobile is decreased. When the leveling valves 151 through 154 are closed, the height of the automobile is maintained.

In the compressed air feed and discharge system 200, a compressor 200b is driven by a motor 200a to produce the compressed air. An air drier 200c dries the compressed air to be fed to the air suspensions 3 through 6, in order to protect pipes and the parts of the air suspensions 3 through 6 from moisture of the compressed air and in order to prevent the pressure change in the main air chambers 3b through 6b and auxiliary air chambers 3c through 6c of the air suspensions 3 through 6, caused by the phase change of the water vapor. When the compressed air is fed to the air suspensions 3 through 6, a check valve 200d provided with a fixed orifice is opened. When the compressed air is discharged from the air suspensions 3 through 6, the check valve 200d is closed so that the air flows out through only the fixed orifice. When the compressed air is discharged from the air suspensions 3 through 6, a releasing solenoid valve 200e is driven so that the compressed air discharged from the air suspensions 3 through 6 through the fixed orifice at the check valve 200d and through the air drier 200c is released into the atmosphere. The solenoid valve 200e can be regulated to change the volume of each of the main air chambers 3b through 6b of the air suspensions 3 through 6 to adjust the height of the automobile.

A vehicle speed sensor 250 is provided in a speedometer, for example, so that the sensor sends out a pulse signal corresponding to a speed of the automobile in response to a rotating speed of an axle of the automobile.

Figure 5:
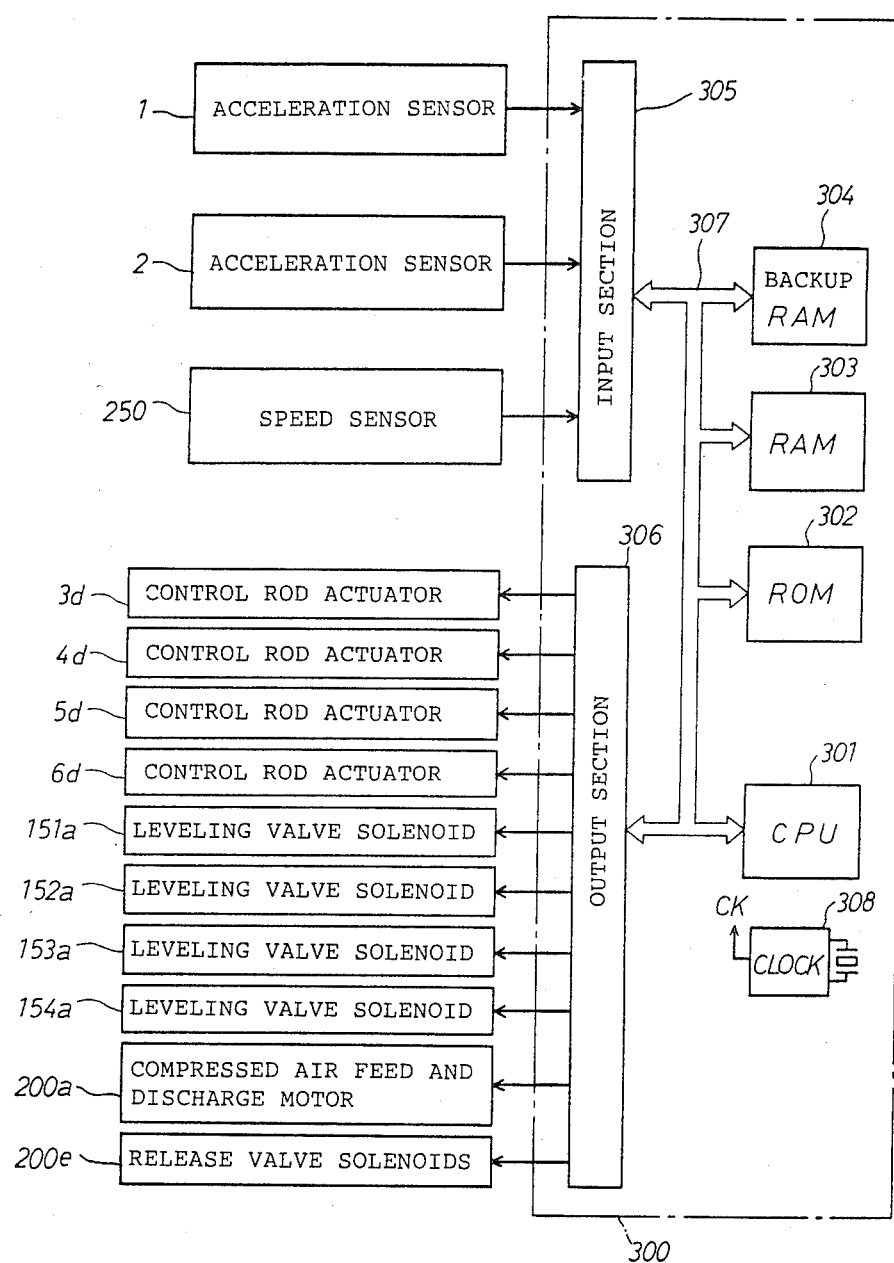
FIG. 5 is a block diagram for explaining operations of an electronic control unit (ECU) shown in FIG. 2.

The output signals of the front wheel acceleration sensors 1 and 2 and the vehicle speed sensor 250 are entered into an electronic control unit (ECU) 300, which processes these signals to send out drive signals to the actuators 3d through 6d of the air suspensions 3 through 6, the leveling valves 151 through 154, the motor 200a of the compressed air feed and discharge system 200 and the solenoid valve 200e to perform appropriate control if necessary. FIG. 5 shows a system of the ECU 300. A central process step unit (CPU) 301 receives the output data from the sensors and performs operations on the data, in response to a control program, to carry out process steps for the control of various units or means or the like. The control program and initial data are stored in a read-only memory (ROM) 302. The data, which are entered in the ECU 300, and data necessary for operations and control, are stored into and read out of a random-access memory (RAM) 303. A backup RAM 304 is backed up by a battery so that even if the ignition key switch of the automobile is turned off, the backup RAM retains data which are needed after the turning-off of the switch. An input section 305 includes an input port (not shown), a wave-shaping circuit if necessary, a multiplexer which selectively sends out the output signals of the sensors to the CPU 301 and an A/D converter which converts an analog signal into a digital signal. An output section 306 includes an output port (not shown) and a drive circuit for driving the actuators according to the control signals of the CPU 301 as occasion demands. A bus 307 connects circuit components such as the CPU 301 and the ROM 302, the input section 305 and the output section 306 to each other to transmit data. A clock circuit 308 sends out a clock signal at preset intervals to the CPU 301, the ROM 302, the RAM 303 and so forth so that a control timing is set by the clock signal.

The process steps, which are performed by the ECU 300, are hereinafter described referring to flowcharts shown in FIGS. 6A and 6B. The main routine represented by the flowchart of FIG. 6A is repeatedly performed in every preset time interval, such as 5 msec. An outline of the process step Steps shown in the flowchart is described as follows, with the Step number in the parentheses:

(1) An absolute current front wheel acceleration is determined (540 and 550).

(2) it is judged whether or not the current acceleration exceeds a predetermined value (600).

(3) If the acceleration is judged to have exceeded the predetermined value, the characteristic of the rear suspensions is altered to deal with passing over a bump or dip of a road surface (660) which the front wheel has detected. In this case, under such driving condition of the automobile that the controllability and stability of the automobile need to be considered more important than the feed of ride, the characteristic of the rear suspensions is made to be 'hard', in definite, the main chambers 3b and 4b and auxiliary air chambers 3c and 4c of the air suspensions 3 and 4 are discommunicated with each other to increase the spring constant.

The above-mentioned operations (1), (2) and (3) correspond to the main process steps for producing the effect of the present invention, and still another operation (4) mentioned below is added to the main operations (1), (2) and (3) in the embodiment.

(4) Subsequently to the operation (3), the characteristic of the rear suspensions is returned to the original state after the rear wheels have passed over the bump or dip of the road surface (690). In this case, the rear suspension characteristic is altered to be 'soft', in definite, by communicating the main air chambers 3b and 4b with the auxiliary air chambers 3c and 4c respectively to decrease the spring constant.

The details of the main routine shown in FIG. 6A are hereinafter described. The routine is performed in every 5 msec. It is firstly judged whether or not the process steps are being performed for the first time since the activation of the ECU 300 (510). If the process steps are judged to be being performed for the first time, initial setting is performed (520), all variables are cleared and all flags are reset except a reference G0 which is explained later. After the initial setting is performed (520) or if the process steps of the routine are judged to be being performed for the second time or later, the speed V of the automobile is detected (530), in terms of the output signal of the vehicle speed sensor 250. A current front wheel vertical acceleration GR and GL are then detected (540) by the front wheel acceleration sensors on the right suspension arm and on the left suspension arm respectively. Then the greater one of the absolute values of GR and GL is determined to be an absolute acceleration |G| (550).

It is then judged (560) whether or not the control of the suspensions is in an 'auto' mode. If the driver of the automobile has not selected the 'auto' mode by a manual switch, the routine is terminated. If he has selected the 'auto' mode, it is judged (570) whether or not the automobile is running. When the detected output of the vehicle speed sensor 250 is not lower than a predetermined level, the automobile is judged to be running. If the automobile is judged to be running, it is then judged (580) whether or not a flag F2 is set. The flag F2 is for indicating that, when it is set, the rear suspension characteristic is altered in response to a bump or dip of a road surface. As the flag F2 has been reset by the initial setting (520), it is then judged whether or not a timer TA exceeds a predetermined value T0 (590). The timer TA is for counting a time interval to ensure that the front wheels have detected the surface irregularity. The timer TA has also been cleared by the initial setting and it is not counted up by an interrupt counting routine of FIG. 6B, since F2=0 and F1=0 this time, the timer TA does not exceed the value T0.

It is then judged whether or not the absolute acceleration |G| exceeds the reference G0. If |G| is less than G0, the timer TA and a flag F1 are reset and G0 is replaced by a predetermined criterion value G00 (610). The flag F1 is for indicating that |G| exceeds G0.

While |G| = <G0, the process steps are performed through Steps 510, 530, 540, 550, 560, 570, 580, 590, 600 and 610 repeatedly.

When at least one of the front wheels meets a bump or dip, the acceleration of the vertical movement of the front wheel increases. If the absolute acceleration |G| is judged to have exceeded the reference G0, it is judged whether or not the flag F1 is set (620). As at first F1=0, F1 is set, TA is started counting and G0 is replaced by another value G00−ΔG. ΔG is subtracted from the criterion G00 in order to prevent unstable hunting by making a hysteresis control.

In the following cycles of the process step Steps, since F1=1, Steps 510, 530, 540, 550, 560, 570, 580, 590, 600 and 620 are performed. In the mean time, when the timer TA increases to exceed T0 (590), the timer TA and the flag F1 are reset, a timer TB is started counting, the flag F2 is set and G0 is replaced by the criterion G00 (640). The timer TB is for counting the time interval for the rear wheels to pass the bump or dip after the front wheel has passed it.

A time interval TV between a time point when the front wheel detects the bump or dip and a time point when the rear wheels pass it is calculated (650) as follows:

$$TV = (A1/V) + A2$$

A1: Wheelbase
A2: Compensatory term (constant)

The compensatory term A2 is determined in consideration of the detection lags of the front acceleration sensors 1 and 2, the time taken for the rear wheels to pass over the bump or dip of the road surface, etc.

Then the ECU drives the actuators 3d and 4d of the air suspensions 3 and 4 to alter the rear suspension characteristic to the 'hard' state. In definite, each of the actuators 3d and 4d rotates the rotary valves 44b to discommunicate the main and the auxiliary air chambers. Thus the controllability and stability of the automobile are maintained.

Since the flag F2 has been set, it is judged whether or not the timer TB exceeds the time interval TV (670) in the following cycles of the process Steps. If TB= <TV, Steps 510, 530, 540, 550, 560, 570, 580, 670, 590, 600 and 610 are repeatedly performed. If it is realized that |G| >G0 in the mean time, the hardening control of the rear suspension characteristic is performed again. If TB>TV (670), i.e. a time interval TV has elapsed since the rear suspension characteristic has been altered to the 'hard' state, the timer TB and the flag F2 are reset (680). So the timer TB is not counted up thereafter in the counting routine of FIG. 6B.

Then the rear suspension characteristic is returned to the 'soft' state (690), in definite the main and the auxiliary air chambers of the air suspensions 3 and 4 are communicated with each other by rotating the rotary valves 44b.

Thus, when a bump or dip of the road surface is detected at a front wheel, the characteristic of the rear wheel suspensions is altered to ensure the controllability and stability of the automobile. And after the rear wheels have passed the irregularity, the suspension characteristic is returned to the original state.

While the alteration of the rear suspension characteristic is that from the original 'soft' state to the 'hard' state in the above embodiment, the inverse alteration, i.e. from the original 'hard' state to the 'soft' state, can be adopted if the ride comfort is to be more considered. When the automobile is running with a high speed, the alteration to the 'hard' state is preferable because the controllability and stability are more required.

Figure 7A:
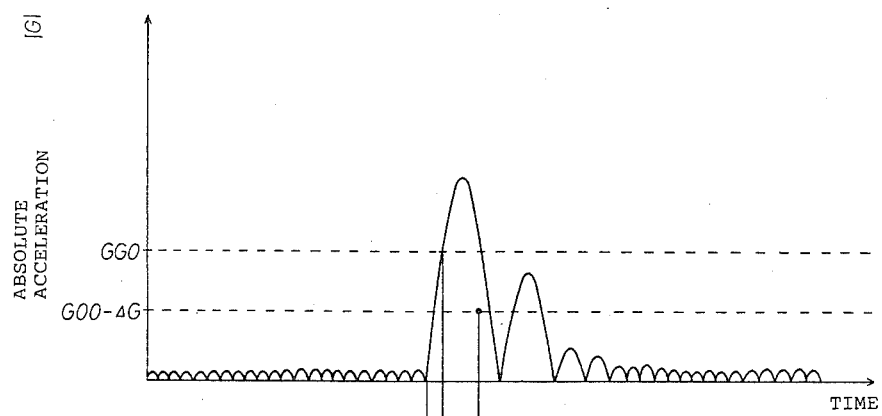
FIGS. 7A, 7B and 7C show timing charts of a front wheel absolute acceleration, an actuator drive signal and a rear height explaining the process steps of the first embodiment.
Figure 7B:
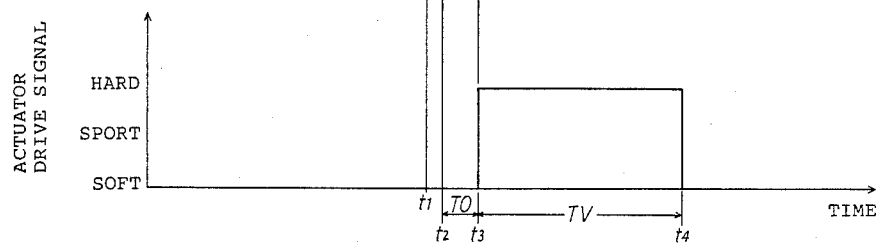
Figure 7C:
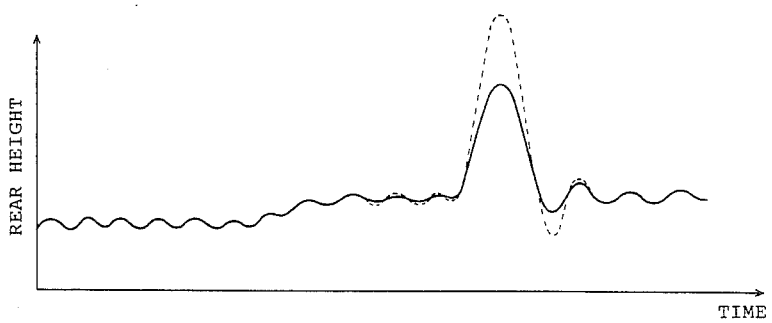

FIGS. 7A, 7B and 7C show timing charts of the process steps for the above-mentioned alteration and returning of the rear suspension characteristic. Before a time point t1, the automobile is running on a flat part of the road surface, as shown in FIG. 7A, the absolute acceleration |G| obtained from at least one of the front acceleration sensors 1 and 2 draws waves of small amplitude. When the front wheel begins to move down into a dip of a road surface, the absolute acceleration |G| sharply increases. At a time point t2, |G| exceeds G00 and it is judged in Step 600 of the flowchart shown in FIG. 6A that |G|>G0, G0 being equal to G00. During the time interval T0 from the time point t2, the absolute acceleration |G| is kept being detected. The reference G0 is already replaced by G00−αG (630). From a time point t3, which is the time interval T0 later than the time point t2, and only while |G|>G0, the ECU 300 drives the actuators 3d and 4d to rotate the rotary valves 44b to discommunicate the main and the auxiliary air chambers. At a time point t4 which is the time interval TV later than the time point t3 the actuator drive signal is terminated and the rotary valves 44b communicates the main and the auxiliary air chambers. Between these time points t3 and t4, the rear wheels pass the dip.

If different drive signals for opening and closing the valves 44b, respectively, are sent out to the actuators 3d and 4d, the closing drive signal is sent out at the time point t3 and the opening drive signal is sent out at the other time point t4. If the rear wheel moves up on a bump of a road surface, the front wheel acceleration signal draws similar wave as described before and the process steps are performed similarly.

In this embodiment, the main air chambers 3b and 4b are discommunicated with the auxiliary air chambers 3c and 4c when the wheels move up on a bump or move down into a dip of a road surface to keep the controllability and stability good. For that reason, a body height amplitude at the rear axle is smaller than that in the normal running state. If the rear suspension characteristic is altered to the 'soft' state in the same case, the automobile height amplitude at the rear wheel is larger than that of the normal running state.

Since this embodiment has the above-mentioned constitution, the good controllability and stability of the automobile can be maintained and the rear portion of the automobile can be prevented from being shocked. The shocking of the rear wheel would impart an unpleasant vibration not only to the rear seat of the automobile but also to its front seat. Therefore, the absorption of the shocking of the rear wheels results not only in keeping the whole automobile from being shocked, but also in improving the feed of the ride of the automobile. Since the characteristic of the rear suspensions is not unclearly altered but is set in distinct states for the normal running of the automobile and its running over the bump or dip of the road surface, respectively, the controllability and stability and the feel of ride in the normal running of the automobile are simultaneously improved as well as those in the running over the bump or dip. In addition, the degree of freedom of design of the suspension characteristics is increased.

While the main air chambers 3b and 4b are communicated or discommunicated with the auxiliary air chambers 3c and 4c, i.e. there are only two states, 'soft' and 'hard', in the above embodiment, the rear suspension characteristic can be altered into more different states by using the large and the small diameter passages 70 and 74 according to the size of the bump or dip.

The damping force of the shock absorbers 3a and 4a of the air suspensions 3 and 4 can be altered by operating the control rod 20 instead of altering the spring constant, or they may be altered simultaneously. If the controllability and stability are considered more important, the damping force is altered to a higher value, and if the ride comfort is more preferred, it is altered to a lower value.

The use of the acceleration of the front wheel movement for the detection of the bump or dip of the road surface enables the earliest detection thereof.

Figure 1:
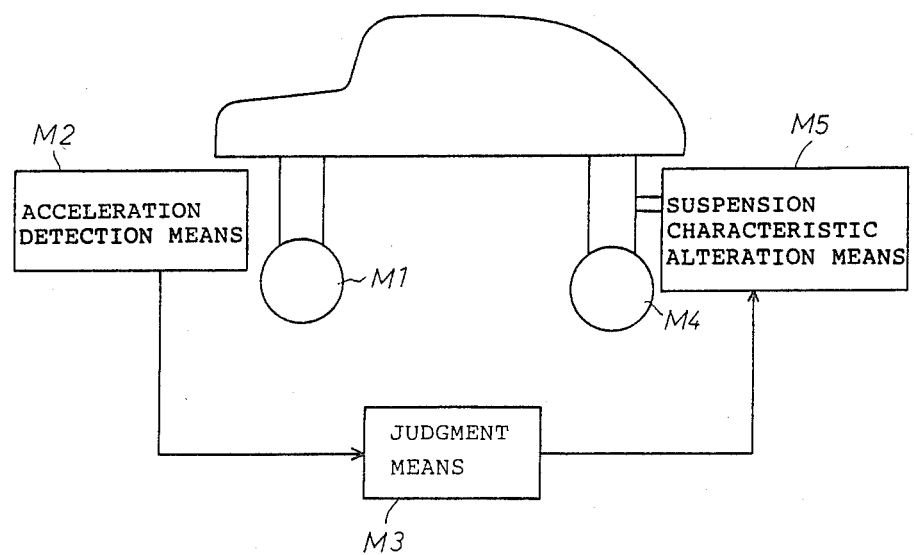
FIG. 1 is a schematic block diagram showing the basic idea of the present invention.

In the above embodiment, the front wheel acceleration sensors 1 and 2 correspond to the front wheel acceleration detection means, the ECU to the judgment means and a part of the rear suspension characteristic alteration means and the air suspensions 3 and 4 to a part of the rear suspension characteristic alteration means, respectively, of FIG. 1.

Figure 8A:
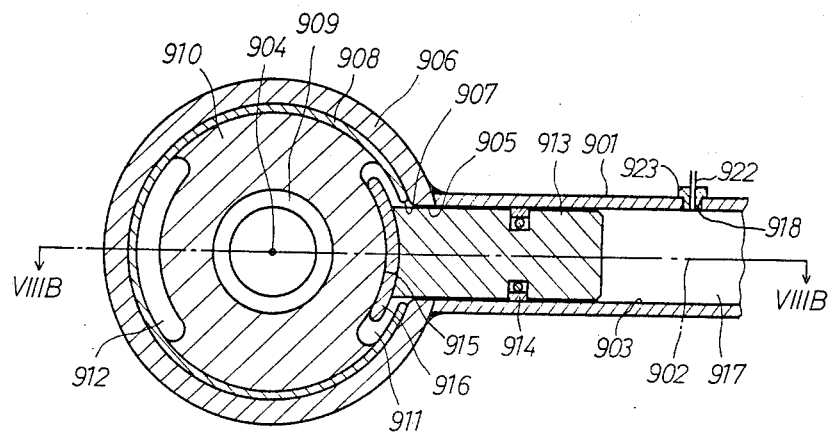
FIGS. 8A and 8B show sectional views of a variable-stiffness bush used in a suspension characteristic alteration means.
Figure 8B:
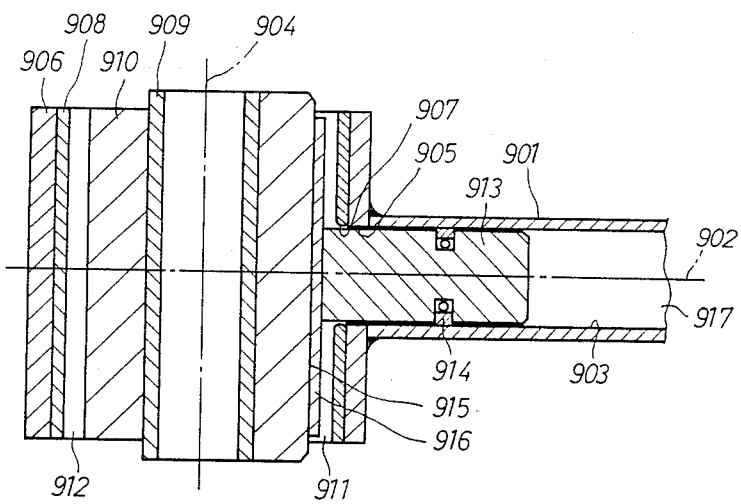

Examples of other suspension characteristic alteration means not for any air suspension are described below. The first example is a bush for a joint of a suspension bar such as the upper and lower control arms of a suspension, as shown in FIGS. 8A and 8B. The bush is provided with a mechanism for changing the stiffness of the bush to alter the characteristic of a suspension. The changing of the stiffness means that of the spring constant or damping force of the bush. FIG. 8A shows a longitudinal cross sectional view of the joint of the suspension bar. FIG. 8B shows a cross sectional view along a line VIIIB—VIIIB shown in FIG. 8A. A control arm 901 extends along on an axis 904 perpendicular to the axis 902 and a sleeve 906 which has a hole 905 is welded around the hole at one end of the control arm 901. An outer cylinder 908 having a hole 907 is pressfitted in the sleeve 906. An inner cylinder 909 is provided in the outer cylinder 908 concentrically thereto. The bush 910 made of vibration-proof rubber is interposed between the outer cylinder 908 and the inner cylinder 909. The bush 910 and the outer cylinder 908 define openings 911 and 912 which are located in the face of each other along the axis 902 and extend as arcs around the axis 904, so that the stiffness in the direction of the axis 902 is set at a relatively low value. The hole 903 of the control arm 901 constitutes a cylinder which supports a piston 913 movably back and forth along the axis 902. A sealing member 914 is tightly packed in between the piston 913 and the inside surface of the hole 903. A contact plate 916 is secured at one end of the piston 913. The contact plate 916 curves about the axis 904 and extends along the axis so that the plate is brought into tight contact with the inside surface 915 of the opening 911. The same system as shown in FIGS. 8A and 8B is provided at the other end of the control arm 901. A cylinder chamber 917 is defined between the piston 913 and another piston (not shown) fitted with the other end of the control arm 901. The cylinder chamber 917 communicates with the exterior through a tapped hole 918 provided in the control arm 901. A nipple 923 secured on one end 922 of a conduit connected to an oil pressure source not shown in the drawings is secured in the tapped hole 918 to apply oil pressure to the cylinder chamber 917. When the oil pressure in the cylinder chamber 917 is relatively low, the force pushing the piston 913 leftward as to the drawings is so weak that the piston is held in such a position shown in the drawings that the contact plate 916 is brought into light contact with the inner surface 915 of the bush 910. As a result, the stiffness of the bush 910 in the direction of the axis 902 is made relatively low. When the oil pressure in the cylinder chamber 917 is relatively high, the piston 913 is driven leftward as to the drawings and the contact plate 916 pushes the inner surface 915 of the bush 910 so that the portion of the bush between the contact plate and the inner cylinder 909 is compressed. As a result, the stiffness of the bush 910 in the direction of the axis 902 is heightened.

If the suspension bar is provided between the body and the rear wheel of an automobile, the characteristic of the suspensions for the rear wheels can be altered by regulating the oil pressure in the cylinder chamber 917 through the action of an actuator such as a pressure control valve. When the oil pressure is heightened by an instruction from an ECU 300, the stiffness of the bush 910 is enhanced to increase the damping force and spring constant of the suspension to improve the controllability and stability of the automobile. When the oil pressure is lowered, the shock at the rear portion of the automobile is reduced.

Figure 9A:
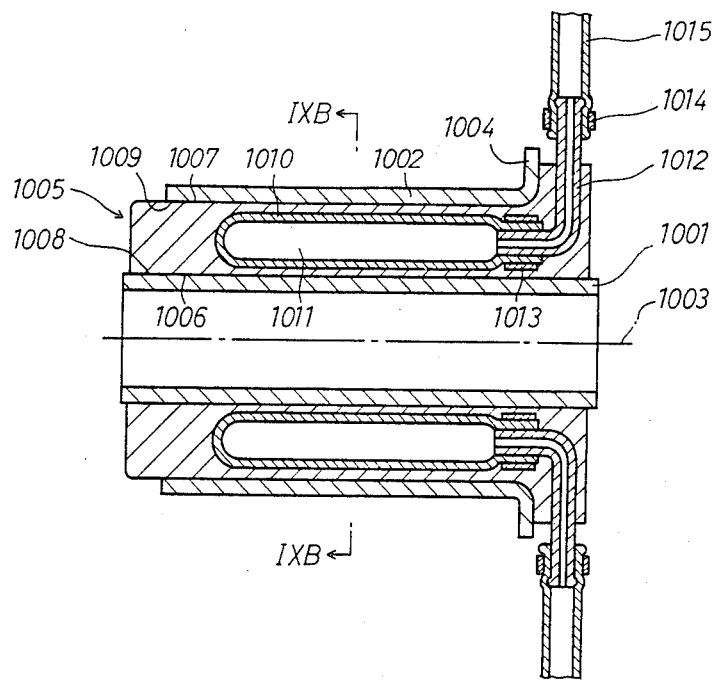
FIGS. 9A and 9B show sectional views of another variable-stiffness bush.
Figure 9B:
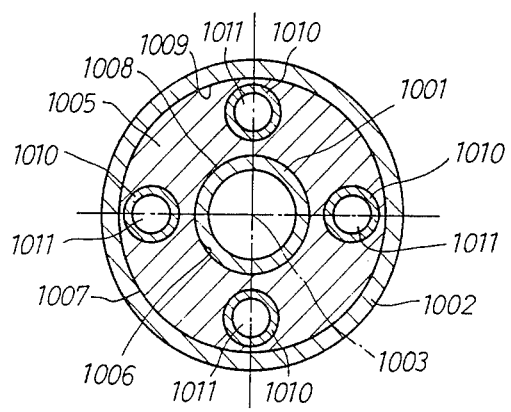

The second example is another bush shown in FIGS. 9A and 9B and has the same function as the former. FIG. 9A shows a longitudinal cross sectional view of the bush constructed together with an inner and an outer cylinders as a bush assembly. FIG. 9B shows a cross sectional view along a line IXB—IXB shown in FIG. 9a. Four expansible and compressible hollow bags 1010, which extend along an axis 1003 and are separately located in equiangular positions around the axis, are embedded in the bush 1005, and define four chambers 1011 extending along the axis 1003 and separately located in equiangular positions around the axis. Each hollow bag 1010 is secured at one end of a coupler 1012 embedded in the bush 1005, by a clamp 1013, so that the chamber 1011 communicates with the exterior of the bush through the coupler 1012. One end of a hose 1015 is fixedly connected to the other end of the coupler 1012 by a clamp 1014, and the other end of the hose 1015 is connected to a compressed air source through an actuator such as a pressure control valve not shown in the drawings, so that controlled air pressure can be introduced into each chamber 1011. When the actuator is put in operation by an ECU 300, the air pressure in each chamber 1011 can be varied to change the stiffness of the bush in a stepless manner. The stiffness of the bush can thus be appropriately changed to be high (hard) or low (soft) after a shock at the front wheel of the automobile is detected.

Figure 10A:
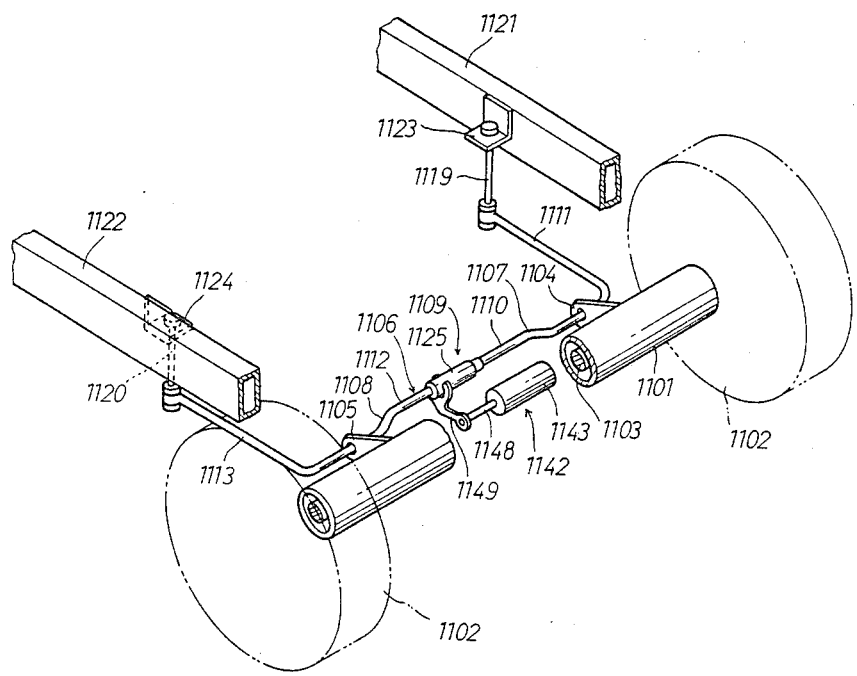
FIGS. 10A, 10B, 10C, 10D, 10E, 10F and 10G show a system of a variable-stiffness stabilizer.
Figure 10B:
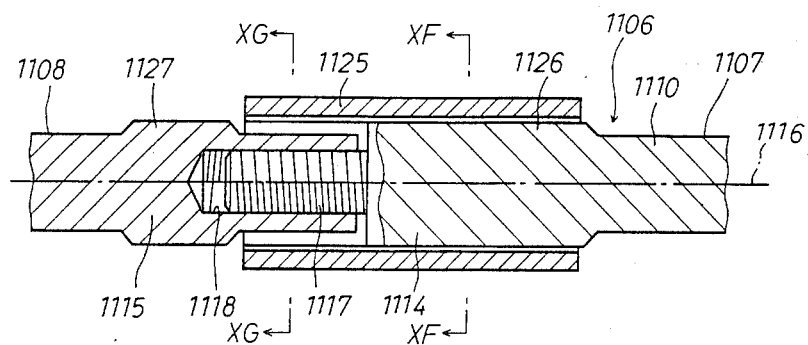
Figure 10C:
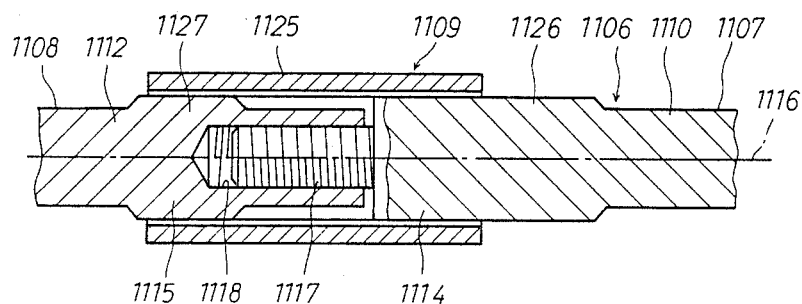
Figure 10D:
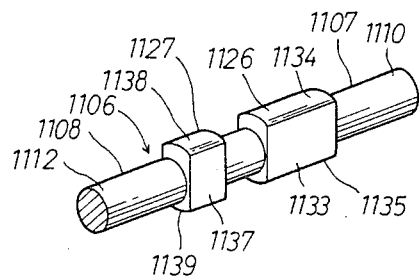
Figure 10E:
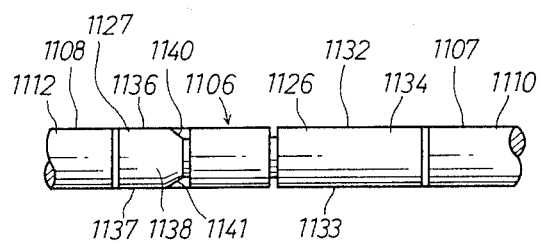
Figure 10F:
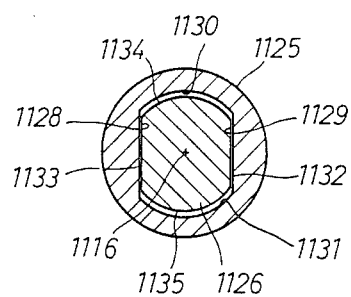
Figure 10G:
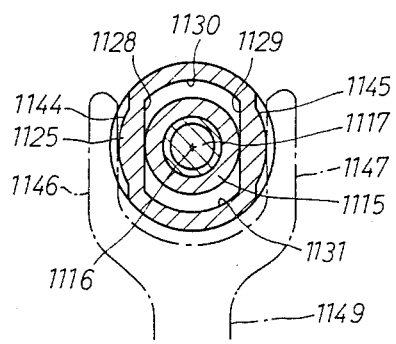

FIGS. 10A, 10B, 10C, 10D, 10E, 10F and 10G show a system of a stabilizer as the third example. FIG. 10A shows an exploded perspective view of the torsion-bar-type stabilizer built in the axle-type rear suspension of an automobile. FIGS. 10B and 10C show enlarged partial longitudinal cross sectional views of the main part of the stabilizer in the coupled and uncoupled states thereof. FIGS. 10D shows a perspective view of the main part shown in FIGS. 10B and 10C and removed of a clutch. FIG. 10E shows a plan view of the main part shown in FIG. 10D. FIG. 10F shows a cross sectional view along a line XF—XF shown in FIG. 10B. FIG. 10G shows a cross sectional view along a line XG—XG shown in FIG. 10B. An axle 1103 coupled with wheels 1102 is rotatably supported by an axle housing 1101. A pair of brackets 1104 and 1105 are secured on the axle housing 1101, in positions separated from each other in the direction of the width of the automobile. The torsion-bar-type stabilizer 1106 is coupled to bushes not shown in the drawings. The stabilizer 1106 includes a right portion 1107 and the left portion 1108 can be selectively coupled to each other integrally by a coupling unit 1109. A protrusion 1117 and a hole 1118, which extend along an axis 1116, are formed at the ends 1114 and 1115 of rods 1110 and 1112 opposite arms 1111 and 1113, and are provided with a male screw and a female screw which are engaged with each other to couple the rods 1110 and 1112 rotatably relative to each other around the axis 1116. The tips of the arms 1111 and 1113 are coupled to brackets 1123 and 1124 secured on the side frames 1121 and 1122 of the vehicle, by links 1119 and 1120. the coupling unit 1109 includes the cylindrical clutch 1125, a clutch guide 1126 which is provided at one end 1114 of the rod 1110 and supports the clutch 1125 unrotatably relative to the guide around the axis 1116 but movably back and forth along the axis, and a clutch bearer 1127 which is provided at the end 1115 of the rod 1112 and bears the clutch 1125 unrotatably relative to the bearer around the axis 1116. The inside circumferential surface of the clutch 1125 includes planes 1128 and 1129 facing each other across the axis 1116 and extending in parallel with each other along the axis, and partially cylindrical surfaces 1130 and 1131 adjoining the planes in positions opposed to each other across the axis 1116, as shown in FIGS. 10F and 10G. Correspondingly to the inside circumferential surface of the clutch 1125, the peripheral surface of the clutch guide 1126 includes planes 1132 and 1133 facing each other across the axis 1116 and extending in parallel with each other across the axis, and partially cylindrical surfaces 1134 and 1135 adjoining the planes in position opposed to each other across the axis 1116. The peripheral surface of the clutch bearer 1127 includes planes 1136 and 1137 facing each other across the axis 1116 and extending in parallel with each other along the axis, and partially cylindrical surfaces 1138 and 1139 adjoining the planes in position opposed to each other across the axis 1116. The planes 1132 and 1133 of the clutch 1126 are always engaged with those 1128 and 1129 of the clutch 1125. When the clutch 1125 is in a position shown in FIG. 10C, the planes 1136 and 1137 of the clutch bearer 1127 are also engaged with those 1129 and 1128 so that the right portion 1107 and left portion 1108 of the stabilizer are integrally coupled to each other unrotatably relative to each other around the axis 1116. The ends of the planes 1136 and 1137 of the clutch bearer 1127 at the right portion 1107 of the stabilizer are chamfered at 1140 and 1141 so that even if the rods 1110 and 1112 are slightly rotated relative to each other around the axis 1116, the clutch 1125 can be moved from a position shown in FIG. 10B to a position shown in FIG. 10C, to couple the right portion 1107 and left portion 1108 of the stabilizer integrally to each other as the arms 1111 and 1113 of the portions are on the same plane. The clutch 1125 is moved back and forth along the axis 1116 by an actuator 1142 regulated by an ECU 300. The actuator 1142 includes a hydraulic piston-cylinder unit 1143 secured on a differential casing (not shown), and a shifting fork 1149 which includes arms 1146 and 1147 engaged in the grooves 1144 and 1145 of the peripheral surface of the clutch 1125, as shown in FIG. 10G, and is coupled to the piston rod 1148 of the piston-cylinder unit 1143. When the clutch 1125 is placed in a position shown in FIG. 10C, by the actuator 1142 according to an instruction from the ECU 300, the right portion 1107 and left portion 1108 of the stabilizer 1106 are integrally coupled to each other to put the stabilizer in such a state that it can fulfill its function to reduce the rolling of the vehicle to improve its controllability and stability. When the clutch 1125 is placed in a position shown in FIG. 10B, by the actuator 1142, the right portion 1107 and left portion 1108 of the stabilizer 1106 can be rotated relative to each other around the axis 1116 to reduce the shock on the vehicle, particularly the shock on its wheels on only one side of the vehicle, or improve the feeling of ride of the vehicle.

Figure 11A:
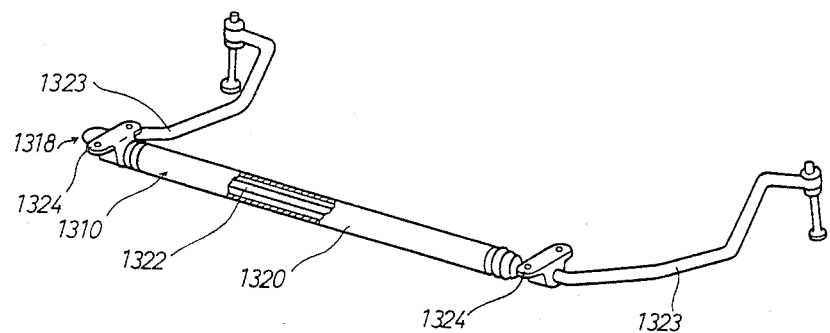
FIGS. 11A and 11B show a system of another variablestiffness stabilizer.
Figure 11B:
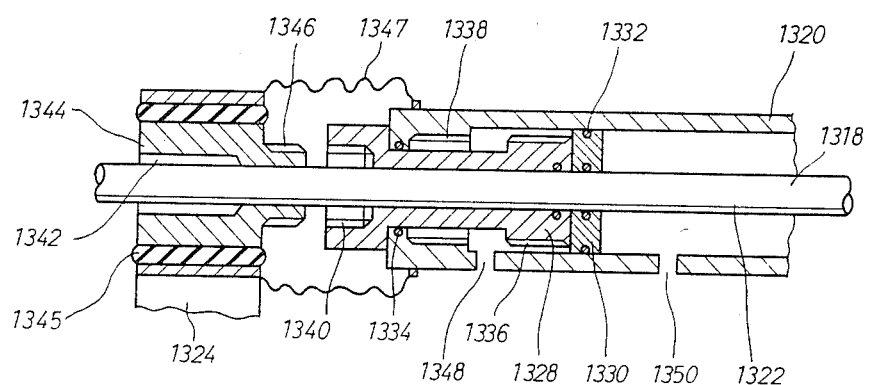

FIGS. 11A and 11B show another stabilizer as the fourth example. A stabilizer-bar-type assembly 1310 includes a first stabilizer bar 1318 and a second stabilizer bar 1320, as shown in FIG. 11A. The first stabilizer bar 1318 includes a main portion 1322 and an arm 1323. The main portion 1322 is attached to the body of a vehicle by a pair of fitting metals 1324 so that the main portion 1322 can be twisted around its axis. The second stabilizer bar 1320 is hollow so that the main portion 1322 of the first stabilizer bar 1318 extends through the second stabilizer bar, as shown in FIG. 11B. The second stabilizer bar 1320 is disposed inside the pair of fitting metals 1324 so that the first stabilizer bar 1318 can be connected to and disconnected from the second stabilizer. A piston 1330 on which a spool 1328 is secured is slidably disposed inside one end of the second stabilizer bar 1320 in such a manner that the piston is liquid-tightly sealed by a sealing member 1322. The spool 1328 is liquid-tightly sealed by a sealing member 1334, and projects out of the second stabilizer bar 1320. The spool 1328 has splines 1336 near the pistons 1330, while the second stabilizer bar 1320 has, at one end, splines 1338 which can be engaged with the splines 1336. The spool 1328 has other splines 1340 inside the outwardly projecting end of the spool. A coupler 1344 is connected to the main portion 1322 of the first stabilizer bar 1318 by splines 1342. Splines 1346, which can be engaged with the splines 1340, are provided on the coupler 1344 at the end opposed to the spool 1328. The coupler 1344 is connected to a mounting metal 1324 through a rubber bush 1345, as shown in FIG. 11B, so that the main portion 1322 of the first stabilizer bar 1318 is twisted by deforming the bush 1345. The coupler 1344 is fitted in such a position that the splines 1340 are engaged with the splines 1346 when the spool 1328 is moved leftward as to the drawings and the splines 1336 are engaged with the splines 1338. A bellowslike boot 1347 for protecting the splines 1340 and 1346 from dust is provided between the coupler 1344 and the second stabilizer bar 1320. Two ports 1348 and 1350 are provided in the second stabilizer bar 1320 in such a manner that the piston 1330 is located between the ports. Piping is provided to lead a pressure fluid to the ports 1348 and 1350 in use. When the pressure fluid is led to one port 1350 through an actuator such as a pressure control valve, the piston 1330 is moved leftward as to the drawings, together with the spool 1328, the splines 1336 are engaged with the splines 1338, and the splines 1340 are engaged with the splines 1346. As a result, the first and the second stabilizer bars 1318 and 1320 are coupled to each other so that the stiffness of the stabilizer bar assembly is heightened. When the pressure fluid is led to the other port 1348, the piston 1330 is moved rightward and the splines are disengaged from each other. As a result, the stiffness of the stabilizer bar assembly is constituted by only that of the first stabilizer bar 1318.

Figure 12A:
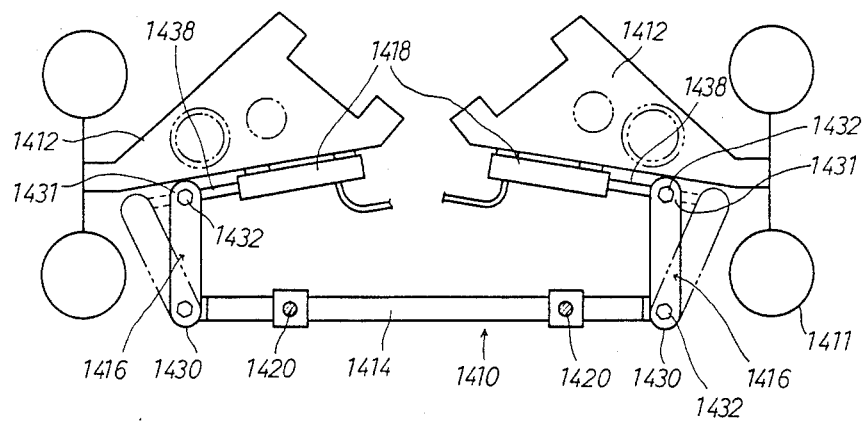
FIGS. 12A, 12B and 12C show a system of still another variable-stiffness stabilizer.
Figure 12B:
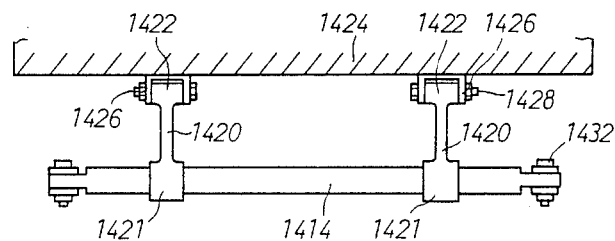
Figure 12C:
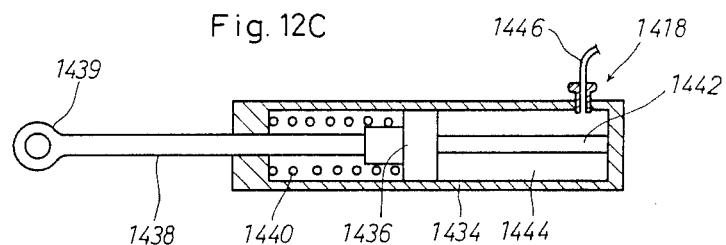

FIGS. 12A, 12B and 12C show still another stabilizer as the fifth example. FIG. 12A shows a plan view of the outline of the stabilizer 1410. Wheels 1411 and suspension arms 1412 are also shown in FIG. 12A. A main part 1414, a pair of arms 1416 and elongation means 1418 are provided. The main part 1414 like a round bar is laid through the bearing portions 1421 of a pair of links 1420 disposed at a distance from each other in the direction of the width of the body 1424 of a vehicle, and is supported by the bearing portions 1421 so that the main part 1414 can be twisted around its axis. The other bearing portions 1422 of the links 1420 at the upper ends are rotatably supported by pins 1428 extending through brackets 1426 welded on the vehicle body 1424. As a result, the main part 1414 is disposed along the width of the vehicle body, and can be twisted relative to the vehicle body. The pair of arms 1416 are made of flat bars. The first ends 1430 of the arms 1416 are coupled to the ends of the main part 1414 by bolts and nuts 1432 so that the arms can be turned about vertical axes. The second ends 1431 of the arms 1416 are located at a distance from the first ends 1430 in the front-to-rear direction of the vehicle body 1424. The front-to-rear direction includes an oblique longitudinal direction. The second ends 1431 of the arms 1416 are displaced in the direction of the width of the vehicle body 1424 by the elongation means 1418 made of power cylinders. Each of the power cylinders includes a cylinder 1434, a piston 1436 liquid-tightly and slidably fitted in the cylinder 1434, a piston rod 1438 coupled at one end to the piston 1436 and projecting at the other end out of the cylinder 1434, and a compressed spring 1440 for displacing the piston 1436 in such a direction as to retract the piston rod 1438. A stopper 1442 secured on the piston 1436 prevents the piston from being displaced more than a predetermined quantity. The cylinder 1434 is secured on the suspension arm 1412 in such a manner that the piston rod 1438 is located more outside than the cylinder 1434 in the direction of the width of the vehicle body. The second end 1431 of the arm 1416 is coupled to the outwardly projecting end of the piston rod 1438 by a bolt and nut 1432 so that the arm 1416 can be turned about the vertical axis. One end of a flexible hose 1446 is connected to the liquid chamber 1444 of the cylinder 1434 opposite to the side on which the compressed spring 1440 is located. The other end of the flexible hose 1446 is connected to a pressure generator (not shown) through an actuator such as pressure control valve. Unless pressure is applied to the liquid chambers 1444 of the power cylinders according to the state of the actuator corresponding to an instruction from an ECU 300, the second ends 1431 of the arms 1416 are located in inner positions as shown in FIG. 12A, so that the wheel rate of the stabilizer is low. When the actuator is operated to apply pressure to the liquid chambers 1444 of the power cylinders, the pressure acts to the pistons 1436 to push out the piston rods 1438 against the compressed springs 1440. As a result, the second ends 1431 of the arms 1416 are pushed out as shown by imaginary lines, i.e. two dot chain lines, in FIG. 12a, to increase the arm ratio of the stabilizer to increase its stiffness against the rolling of the vehicle.

Figure 13A:
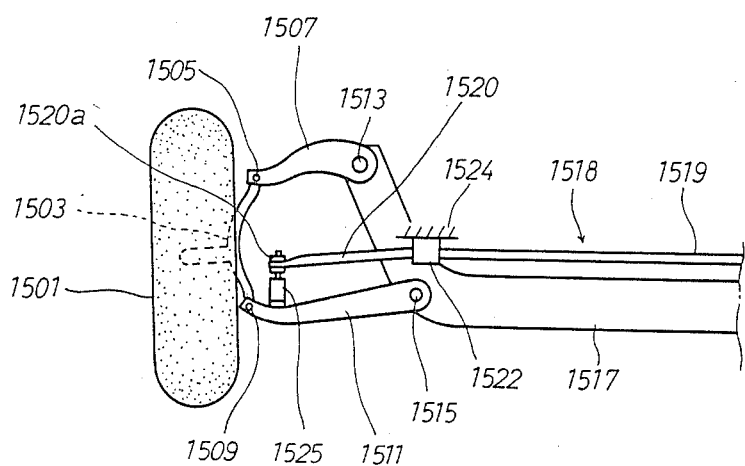
FIGS. 13A and 13B show a system of a unit for coupling a variable-stiffness stabilizer and a lower control arm to each other.
Figure 13B:
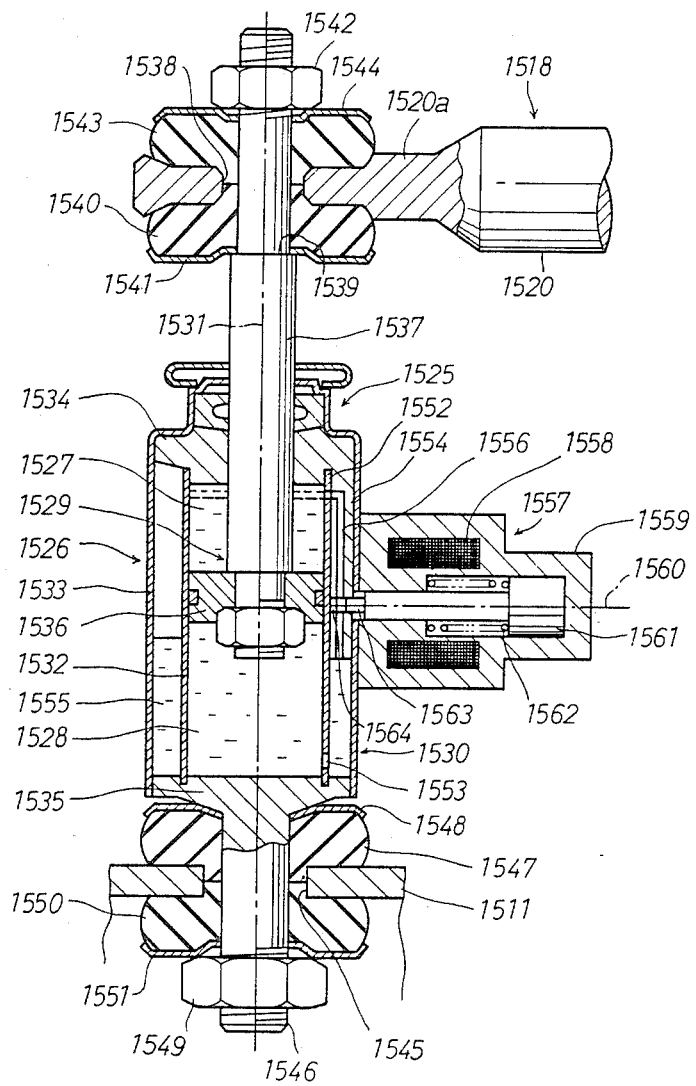

FIGS. 13A and 13B show a system of a coupling unit for a stabilizer and a lower control arm, as the sixth example. FIG. 13A shows a partial front view of a wishbone-type suspension including the coupling unit for the stabilizer for a vehicle. FIG. 13B shows an enlarged cross sectional view of the coupling unit shown in FIG. 13A. A wheel 1501 is rotatably supported by a knuckle 1503. The knuckle 1503 is pivotally coupled at the upper end to one end of an upper control arm 1507 by a pivot 1505, and pivotally coupled at the other end to one end of the lower control arm 1511 by a pivot 1509. The upper control arm 1507 and the lower control arm 1511 are pivotally coupled to the cross member 1517 of the vehicle by pivots 1513 and 1515. The stabilizer 1518, which is shaped as U, is disposed along the width of the vehicle. The stabilizer 1518 is coupled at its central rod 1519 to the body 1524 of the vehicle by brackets 1522 with rubber bushes (not shown), so that the stabilizer can be turned about its axis. The tip 1520a of the arm 1520 of the stabilizer 1518 is coupled to a point near one end of the lower control arm 1511 by the coupling unit 1525.

The coupling unit 1525 includes a piston-cylinder assembly 1526 composed of a piston 1529 and a cylinder 1530 which define two cylinder chambers 1527 and 1528, as shown in detail in FIG. 13. The cylinder 1530 includes an inner cylinder 1532 which supports the piston 1529 movably back and forth along an axis 1531, and outer cylinder 1533 disposed substantially concentrically to the inner cylinder 1532, and end caps 1534 and 1535 which close both the ends of the inner cylinder and the outer cylinder. The piston 1529 includes a main portion 1536, and a piston rod 1537 which bears the main portion 1536 at one end of the piston rod and extends along the axis 1531 through the end cap 1534 and the hole 1538 of the tip of the arm 1520 of the stabilizer 1518.

A rubber bush 1540 and a retainer 1541 for holding the bush are interposed between the shoulder 1539 of the piston rod 1537 and the tip 1520a. A rubber bush 1543 and a retainer 1544 are interposed between the tip 1520a and a nut 1542 screwed on the front end of the piston rod 1537. As a result, the piston rod 1537 is coupled to the tip 1520a of the arm 1520 of the stabilizer 1518 so that an impulsive force is damped. A rod 1546, which extends along the axis 1531 through a hole 1545 of the lower control arm 1511, is secured on the end cap 1535. A rubber bush 1547 and a retainer 1548 for holding the bush are interposed between the end cap 1535 and the lower control arm 1511. A rubber bush 1550 and a retainer 1551 for holding the bush are interposed between the lower control arm 1511 and a nut 1549 screwed on the front end of the rod 1546. As a result, the rod 1546 is coupled to the lower control arm 1511 so that an impulsive force is damped.

The inner cylinder 1532 is provided with through holes 1552 and 1553 near the end caps 1534 and 1535. The end cap 1534 is integrally provided with a projection 1554 extending along the axis 1531 between the inner cylinder 1532 and the outer cylinder 1533 and located in tight contact with the inner and the outer cylinders. The projection 1554 has an internal passage 1556 which is coincident at one end with the through hole 1552 and is opened at the other end into an annular space 1555 between the inner cylinder 1532 and the outer cylinder 1533. As a result, the through hole 1552, the internal passage 1556, the annular space 1555 and the other through hole 1553 constitute a passage means for connecting both the cylinder chambers 1527 and 1528 to each other. A portion of the annular space 1555 is filled with air. Portions of the cylinder chambers 1527 and 1528, the internal passage 1556 and the annular 1555 are filled with oil. The change in the volume of the piston rod 1537 in the cylinder 1530, which is caused by the displacement of the piston 1529 relative to the cylinder, is compensated by the compression or expansion of the air filled in the portion of the annular space 1555.

The communication of the internal passage 1556 is selectively controlled by normally-opened solenoid valve 1557. The solenoid valve 1557 includes a housing 1559 containing a solenoid 1558 and secured at one end on the outer cylinder 1533, a core 1561 supported in the housing 1559 movably back and forth along an axis 1560, and a compressed helical spring 1562 for urging the core 1561 rightward as to FIG. 13B. A valve element 1563 is integrally provided at one end of the core 1561 so that the valve element is selectively fitted into a hole 1564 extending in the projection 1554 across the internal passage 1556.

When no electricity is applied to the solenoid 1558 according to an instruction from an ECU 300, the core 1561 is urged rightward as to the drawing, by the compressed helical spring 1562, to open the valve 1557 to allow the communication of the internal passage 1556. When electricity is applied to the solenoid 1558 according to an instruction from the ECU 300, the core 1561 is driven leftward as to the drawings, against the force of the compressed helical spring 1562, to fit the valve element 1563 into the hole 1564 to shut the internal passage 1556. At that time, the cylinder chambers 1527 and 1528 are disconnected from each other, and the oil in the cylinder chambers is kept from flowing to the opposite cylinder chambers, so that the piston 1529 is hindered from moving relative to the cylinder 1530 along the axis 1531. As a result, the stabilizer 1518 is put in such a state that it can fulfill its function to suppress the rolling of the vehicle to improve the controllability and stability of the vehicle as its wheel on one side moves up on a bump of a road surface for the vehicle and down into a dip of a road surface.

When no electricity is applied to the solenoid 1558, the solenoid valve 1557 is maintained in an open position shown in FIG. 13B, so that the oil in both the cylinder chambers 1527 and 1528 can freely flow to the opposite cylinder chambers through the internal passage 1556 and so forth. As a result, the piston 1529 can freely move relative to the cylinder 1530 so that the tips of both the right and left arms 1520 can freely move relative to the corresponding lower control arms 1511. For that reason, the stabilizer does not fulfill its function, so that the shock at each rear wheel of the vehicle is reduced to keep the feeling of ride of the vehicle good.

Figure 14:
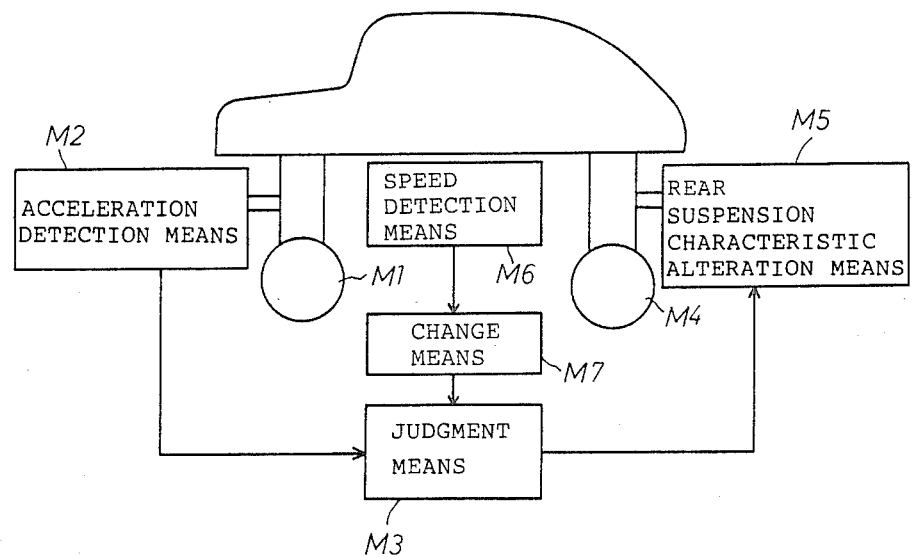
FIG. 14 is a schematic block diagram showing the basic idea of the second embodiment of the invention.

The second embodiment of the invention is hereinafter described with a schematic diagram FIG. 14 showing an automobile provided with a rear suspension controller according to the invention. In addition to a front wheel acceleration detector M2, a judgment section M3 and a rear suspension alternation actuator M5, which act the same function as those of the first embodiment, a vehicle speed detector M6 and a change section M7 are provided in this embodiment. The change section changes the criterion value used in the judgment section according to the vehicle speed which is detected by the vehicle speed sensor M6. The definite system of the embodiment is just the same as that shown in FIGS. 2, 3A, 4A, 4B and 5.

Figure 15B:
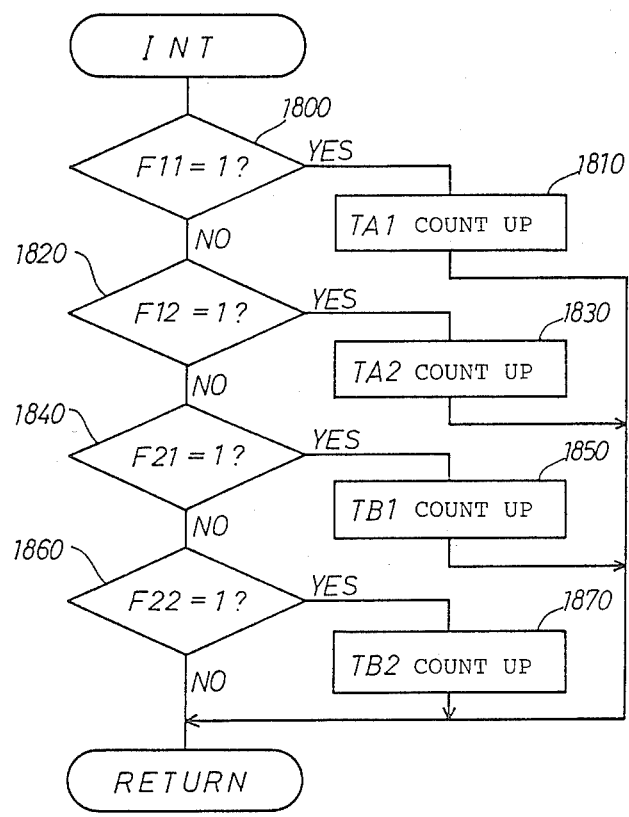
FIG. 15B is a flowchart showing process steps for interrupt counting routine.

The process steps which are performed by the ECU 300 in this second embodiment are hereinafter described referring to flowcharts shown in FIGS. 15A ad 15B and a graph shown in FIG. 15C. The main routine of the process Steps shown in FIG. 15A is repeatedly performed in every predetermined time interval, such as 5 msec. The outline of the process step Steps shown in the flowchart is described as follows, with the Step number in the parentheses:

(1) A current absolute acceleration |G| of a front wheel is determined (1540 and 1550).

(2) It is judged whether or not the current absolute acceleration |G| exceeds references G10 and G20 which are determined according to the vehicle speed (1640, 1650).

(3) According to the result whether the absolute acceleration |G| exceeds the reference values G10 or G20, the characteristic of the rear suspensions is altered (1590, 1605, 1670) to deal with passing over the bump or dip of the road surface which the front wheel detected. In this case, the larger the absolute acceleration |G|, the harder state the rear suspension characteristic is altered to in order to keep the controllability and stability good in passing the irregularity. In definite, the main air chambers 3b and 4b and auxiliary air chambers 3c and 4c of the air suspensions 3 and 4 are discommunicated with each other to increase the spring constant or the control rods 20 of the rear shock absorbers 3a and 4a are rotated to increase the damping force thereof.

The details of the process Steps are hereinafter described. The process steps are repeatedly performed in every 5 msec. It is firstly judged whether or not the process steps are being performed for the first time since the activation of the ECU 300 (1510). If the process steps are judged to be being performed for the first time, initial setting is performed (1520), all variables and all flags are reset, except G10 and G20. After the initial setting is performed (1520) or if the process steps of the routine are judged to be being performed for the second time or later, the speed V of the automobile is detected (1530) in terms of the output signal of the vehicle speed sensor 250. A current front wheel vertical acceleration GR and GL are then detected (1540) by the front wheel acceleration sensors on the right suspension arm and on the left suspension arm respectively. Then the larger one of the absolute values of GR and GL is determined to be an absolute acceleration |G| (1550).

It is then judged (1560) whether or not the control of the suspensions is in an 'auto' mode. If the driver of the automobile has not selected the 'auto' mode by a manual switch, the routine is terminated. If he has selected the 'auto' mode, it is judged (1570) whether or not the automobile is running. When the vehicle speed V is not lower than a predetermined level, the automobile is judged to be running. If the automobile is judged to be running, a time interval TV, which is between the time point when the front wheel detects the bump or dip and the time point when the rear wheels pass it, is calculated (1575) as follow:

$$TV = (A1/V) + A2$$

A1: Wheelbase
A2: Compensatory term (constant)

The compensatory term A2 is determined in consideration of the detection lags of the front acceleration sensors 1 and 2, the time taken for the rear wheels to pass over the bump or dip of the road surface, etc.

It is then judged (1580) whether or not a flag F22 is set. The flag F22 is for indicating that, when it is set, the rear suspension characteristic should be altered to a 'hard' state. If it is not realized that F22=1, it is then judged whether or not a flag F21 is set (1585). The flag F21 is for indicating that, when it is set, the rear suspension should be altered to a 'sport' state. If the result is 'NO', it is then judged whether or not a timer TA1 exceeds a predetermined value T0 (1620). The timer TA1 is for ensuring that the front wheels have detected the road surface irregularity. The timer TA1 has been reset by the initial setting and it is not counted up by an interrupt counting routine of FIG. 15B, since F11=0 this time, the timer TA1 does not exceed the value T0. So the result is 'NO' in this case. In the counting routine of FIG. 15B, timers TA2, TB1 and TB2 are counted up as well as the timer TA1 (1830, 1850, 1870 and 1810) when the corresponding flags F12, F21, F22 and F11 (1820, 1840, 1860, 1800), are set.

It is then judged whether or not the timer TA2 exceeds the reference value T0 (1630). The timer TA2 is also for ensuring that the front wheel has detected the road surface irregularity as the timer TA1. Here also TA2 is reset by the initial setting and, since F12=0, it is not counted up in the counting routine of FIG. 15B, so TA2 does not exceed T0.

It is then judged whether or not the absolute acceleration |G| exceeds the reference value G20 (1640). G20 has been set to be G2(V) by the initial setting (1520). When the automobile is running on a normal, i.e. relatively flat road, |G| is less than G20.

Figure 15C:
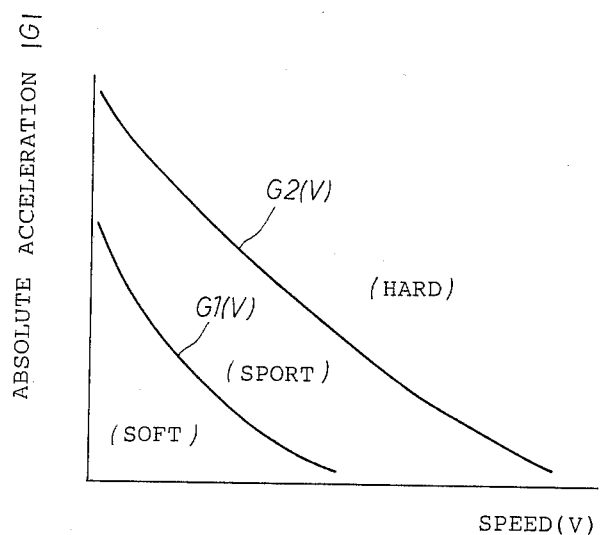
FIG. 15C is a preset graph for determining references of an absolute acceleration.

The values G1(V) and G2(V) for putting into the references G10 and G20 are determined by a preset graph shown in FIG. 15C. Both G1(V) and G2(V) increase with the decrease in the vehicle speed V and G2(V) is set to be always larger than G1(V). G1(V) defines the boundary of the judging reference for the absolute acceleration between the 'soft' state and the 'sport' state and G2(V) defines the boundary between the 'sport' state and the 'hard' state of the rear suspension characteristic. Thus the rear suspension characteristic is altered into three states in this embodiment.

If the result of Step 1640 is 'NO', the flag F12 is reset and the reference value G20 is set to be the current G2(V) (1645). The flag F12 indicates that, when it is set, the relationship |G| > G20 is realized. Then it is judged whether or not |G| > G10 (1650). G10 has also been set to be G1(V) by the initial setting (1520). If the automobile is running on a normal road surface, i.e. a road surface with small irregularities, |G| is less than G10.

If the result is 'NO' at Step 1650, the flag F11 is reset and G10 is set to be G1(V) (1655). Then it is judged whether or not the flag F22 is set (1660). As there has been no change in the flag since the initial setting (1520), the result is 'NO'. It is judged whether or not the flag F21 is set (1665), and the result is 'NO' as the flag F21 is also unchanged since the initial setting (1520).

Then the ECU 300 drives the actuators 3d and 4d of the rear air suspensions 3 and 4 to make the 'soft' state, or lower the spring constant, by rotating the rotary valve 44b to communicate the main air chambers 3b and 4b and the auxiliary air chambers 3c and 4c with the large air passage 70 (670). Thus the present cycle of routine ends.

While |G| = <G10, the process Steps 1510, 1530 through 1585, 1620, 1630 and 1640 through 1670 are repeated.

In the mean time, when a front wheel meets a bump or dip of the road surface, the front wheel acceleration increases. If |G| exceeds G10 at Step 1650, it is judged whether or not the flag F11 is set (1675). Since F11 is still reset, the result is 'NO'. Then the flag F11 is set (1680) and consequently the timer TA1 is started counting up by the counting routine of FIG. 15B. The reference G10 is set to be G1(V)−ΔG (1680), where ΔG is introduced to prevent the possible hunting of the alteration control by making a hysteresis, as explained before. The present cycle of routine ends here.

At Step 1675 of the next cycle of routine, the result is 'YES' this time, since F11=1, and the cycle ends. While TA1 does not ecxeed T0, the process Steps 1510, 1530 through 1585, 1620, 1630, 1640 through 1650 and 1675 are performed repeatedly. Nevertheless, when $|G|=<G10$ in that case, the process Steps 1510, 1530 through 1585, 1620, 1630 and 1640 through 1670 are performed repeatedly, keeping the rear suspension characteristic in the 'soft' state by the process Step of 1670.

When the timer TA1 exceeds T0 (1620), the flag F11 is reset, the flag F21 is set and the timer TA1 is reset (1625). By the setting of the flag F21, the timer TB1 is started counting up (1850) in the counting routine of FIG. 15B. The present routine ends.

At Step 1585 in the next routine, the result is 'YES', since F21=1. Then the ECU drives the actuators 3d and 4d of the rear air suspensions 3 and 4 to make the 'sport' state, which is an intermediate state between the 'soft' and the 'hard' states, by rotating the rotary valves 44b to communicate the main air chambers 3b and 4b and the auxiliary air chambers 3c and 4c respectively with the small air passages 70 (1605). Thus the present cycle of routine ends.

Then it is judged (1610) whether or not the timer TB1 exceeds the time interval TV which has been calculated before. If the result is 'NO', then it is judged whether or not the timer TA1 exceeds the reference value T0 (1620). As the timer TA1 and the flag F11 are reset by the Step 1625 of the preceding routine, the result is 'NO' at Step 1620 this time. The result of the following Step 1630, which judges whether or not the timer TA2 exceeds T0, is also 'NO'. Then after process Steps 640 and 645, it is judged whether or not $|G|>G10$ (1650). If the relation still exists, Steps 675 and 680 are performed and the routine ends. Otherwise if it is realized that $|G|=<G10$, Steps 1655 and 1660 are performed and the routine ends without performing Step 1670, since F21=1. Thus the rear suspension characteristic is kept to be in the 'sport' state and is not returned to the 'soft' state.

When the timer TB1 exceeds the time interval TV, the result of Step 1610 being 'YES', the timer TB1 and the flag F21 are reset (1615). After process Steps 1620, 1630 and 1640 through 1660, the returning operation of the rear suspension characteristic to the 'soft' state is performed (1670), since F21=0 (1665). Then the initial state is recovered.

Next the explanation is made for the case that $|G|$ is large enough to exceed the reference G20. As $|G|$ must exceed G10 before exceeding G20, the result of Step 1650 is 'YES' at first. Then Steps 1675 and 1680 are performed in which the flag F11 is set and the timer TA1 is started counting up. Immediately after that, it is realized that $|G|>G20$ and the result of Step 640 is 'YES'. Then it is judged whether or not the flag F12 is set (1685). As at first the result is 'NO', the flag F12 is set, the timer TA2 is started counting up in the counting routine of FIG. 15B and the reference G20 is set to be G2(V)−ΔG (1690), the ΔG being introduced to prevent unstable hunting as explained before. At this time the timers TA1 and TA2 are both counted up. As TA1 has been started counting earlier, it is realized first TA1>T0 (1620). Then Step 1625 is performed in which the timer TB1 is started counting, the flag F21 is set and the timer TA1 and the flag F11 are reset.

At Step 1605 of the following cycle of the routine, the rear suspension characteristic is altered from the 'soft' state to the 'sport' state (1605), since the result of Step 1585 is 'YES' this time. Immediately after that, it is realized that TA2>T0 (1630) and Step 1635 is performed in which the timer TB2 is started counting, the flag F22 is set and the timer TA2 and the flag F12 are reset. So at Step 1590 of the next cycle of the routine, the rear suspension characteristic is altered to the 'hard' state, since the result of Step 1580 is 'YES'. Then the ECU 300 drives the actuators 3d and 4d of the rear air suspensions 3 and 4 to make the 'hard' state by rotating the rotary valve 44b to discommunicate the main air chambers 3b and 4b and the auxiliary air chambers 3c and 4c respectively. At this point the timers TB1 and TB2 are both counted up. While TB2=<TV (1595), the rear suspension characteristic is kept to be in the 'hard' state, even when $|G|=<G10$ (1650).

When it is realized that TB2>TV (1595), the timer TB2 and the flag F2 are reset (1600). In the next cycle of the routine, the result of Step 1580 is 'NO' and the result of Step 1585 is 'YES' since F21 is still '1'. So the rear suspension characteristic is altered from the 'hard' state to the 'sport' state (1605). Since the timer already elapsed TV, the timer TB1 and the flag F21 are reset (1615). After process Steps 1620, 1630 and 1640 through 1670, the rear suspension characteristic is altered to the 'soft' state. In conclusion, the rear suspension characteristic is returned to the 'soft' state from the 'hard' state, with a very short time interval of the 'sport' state.

Thus when a bump or dip of a road surface is detected at a front acceleration $|G|$, the characteristic of rear wheel suspensions is altered to ensure the controllability and stability of the automobile. And after the rear wheels pass the irregularity, the suspension characteristic is returned to the original state. While, in the above embodiment, the alteration of the rear suspension characteristic is that from the original 'soft' state to the 'hard' state, the inverse alteration, i.e. from the original 'hard' state to the 'soft' state, can be adopted if the ride comfort is to be more considered. When the automobile is running with a high speed, the alteration to the 'hard' state is preferable because the controllability and stability is required.

The criteria of judgment of the absolute acceleration is altered according to the automobile speed in this embodiment because the auqlity of shocks differs depending on the automobile speed. So more elaborate control of the rear suspensions is enabled by this embodiment.

Figure 16A:
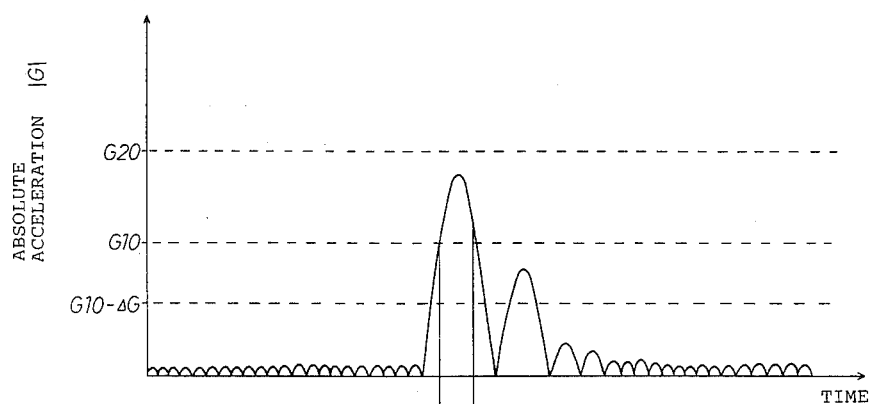
FIGS. 16A, 16B and 16C show timing charts of a front wheel absolute acceleration, an actuator drive signal and a rear height explaining one case of the process steps of the second embodiment.
Figure 16B:
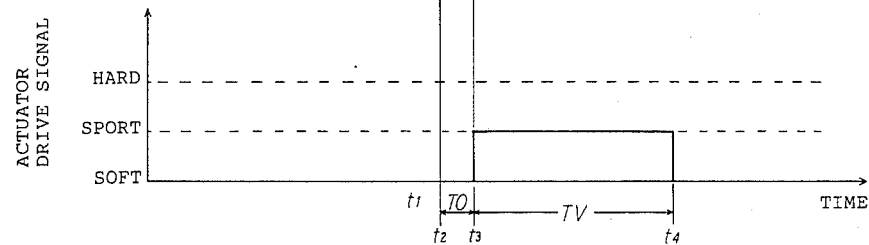
Figure 16C:
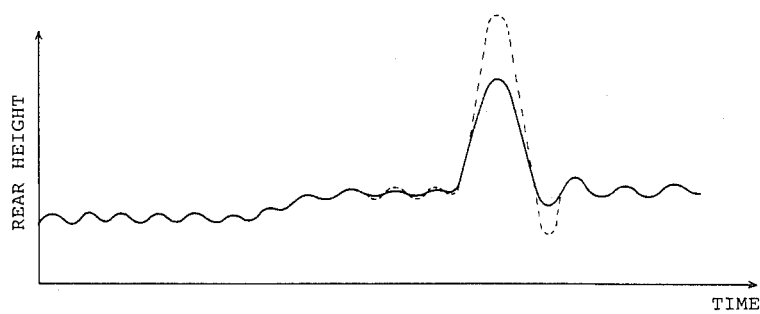

FIGS. 16A, 16B and 16C show timing charts of the process steps for the above-mentioned control of the rear suspension characteristic. Before a time point t1, the automobile is running on a flat part of the road surface, as shown in FIG. 16A, and the absolute front wheel acceleration $|G|$ obtained from either of the front acceleration sensors 1 or 2 draws waves of small amplitude. When the front wheel begins to move down into a dip of the road surface, the absolute acceleration $|G|$ sharply increases. At a time point t2, $|G|$ exceeds G10, and it is judged in Step 1650 of the flowchart shown in FIG. 15A that $|G|>G10$, G10 being equal to G1(V). During the time interval T0 from the time point t2, the absolute acceleration $|G|$ is kept being detected. The reference G10 has been already set to be G1(V)−ΔG (1680). From a time point t3, which is the time interval T0 later than the time point T2, and only while |G|>G10, the ECU 300 drives the actuators 3d and 4d to rotate the rotary valves 44b to make the 'sport' state (1605). At a time point t4 which is the time interval TV later than the time point t3 the rotating drive signal is terminated and the rotary valves 44b communicates the main and the auxiliary air chambers (1670). Between these time points t3 and t4, the rear wheels pass the dip. If different drive signals for opening and closing the valves 44b, respectively, are sent out to the actuators 3d and 4d, the closing drive signal is sent out at the time point t3 and the opening drive signal is sent out at the other time point t4.

Figure 16D:
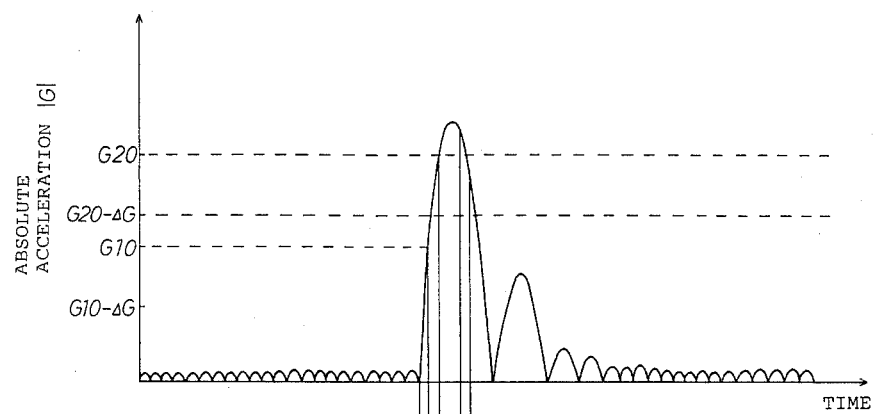
FIGS. 16D, 16E and 16F show those timing charts explaining another case of the process steps of the second embodiment.
Figure 16E:
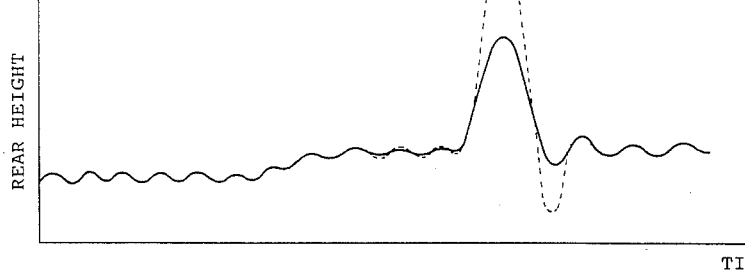
Figure 16F:
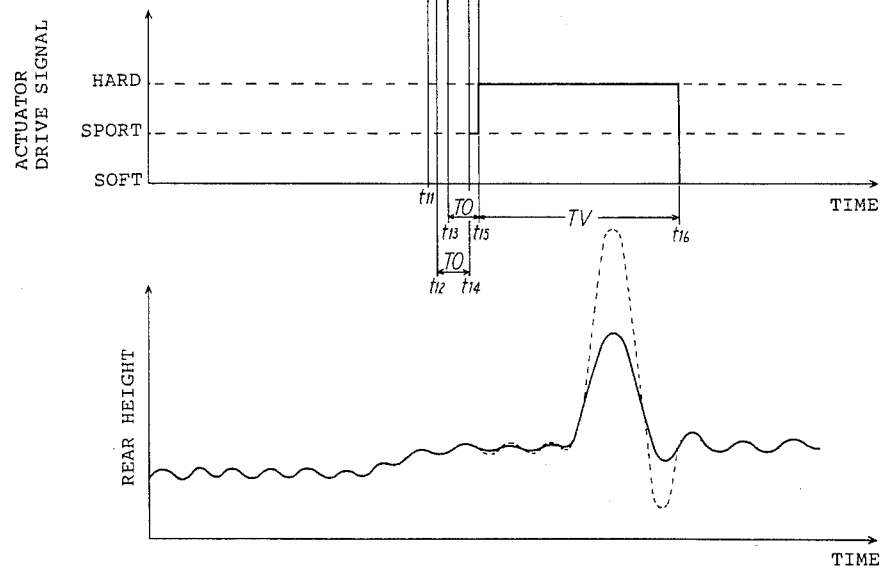

FIG. 16D, 16E and 16F show timing charts of the process steps for the case of passing a deeper dip. Before a time point t11, the automobile is running on a flat part of the road surface, as shown in FIG. 16D. When the front wheel begins to move down into the dip of the road surface, the absolute acceleration |G| sharply increases. At a time point t12 |G| exceeds G10 and immediately after that, at a time point t13 which is within the time interval T0 from the time point t12, |G| exceeds G20. Here G20 is set to be G2(V)−ΔG (1690). At a time point t14 which is the time interval T0 later than the time point t12 the ECU 300 drives the actuators 3d and 4d to rotate the rotary valves 44b to make the 'sport' state. At a time point t15 which is the time point T0 later than the time point t13, the ECU drives the actuators 3d and 4d to rotate the rotary valves 44b to make the 'hard' state (1590). And at a time point t16 which is the time interval TV later than the time point t15 the ECU drives rotary valves 44b to make the original 'soft' state(1670). Between these time points t15 and t16, the rear wheels pass the dip.

If the rear wheel moves up on a bump of a road surface, the front wheel acceleration signal draws similar wave as described before and the process steps are performed similarly.

In this embodiment, the main air chambers 3b and 4b are communicated with the auxiliary air chambers 3c and 4c when the wheels move up on a bump or move down into a dip of a road surface to keep the controllability and stability good. For that reason, a body height amplitude at the rear wheel is smaller than that of the normal running state. If the rear suspension characteristic is altered to the 'soft' state in the same case, the body height amplitude at the rear wheel is larger than that of the normal running state.

Since this embodiment has the above-mentioned constitution, the good controllability and stability of the automobile can be maintained at any vehicle speed by changing the judging reference according to the speed. The shock of the rear wheel would impart an unpleasant vibration not only to the rear seat of the automobile but also to its front seat. Therefore, the absorption of the shock of the rear wheels results not only in keeping the whole automobile from being shocked, but also in improving the feel of the ride of the automobile. Since the characteristic of the rear suspensions is not unclearly altered but is set in distinct states for the normal running of the automobile and its running over the bump or dip of the road surface, respectively, the controllability and stability and the feel of the ride in the normal running of the automobile are simultaneously improved as well as those in the running over the bump or dip. In addition, the degree of freedom of design of the suspension characteristics is increased.

The damping force of the shock absorbers 3a and 3b of the air suspensions 3 and 4 can be altered by operating the control rod 20 instead of altering the spring constant, or they may be altered simultaneously. If the controllability and stability are considered more important, the damping force is altered to a higher value, and if the ride comfort is more preferred, it is altered to a lower value.

In the above embodiment, the front wheel acceleration sensors 1 and 2 correspond to the front wheel acceleration detector, the vehicle speed sensors 250 to the vehicle speed detector M6, the ECU to the judgment section M3 and a part of the rear suspension characteristic alteration section M5 and the air suspensions 3 and 4 to a part of the rear suspension characteristic alteration section M5, respectively, of FIG. 14.

What is claimed is:

1. A rear suspension controller for a vehicle having a suspension between a body and a rear wheel of the vehicle comprising:
    a front wheel acceleration detection means for detecting an acceleration of a vertical movement of a front wheel and for generating an acceleration signal;
    a judgment means for comparing the acceleration signal with a reference range and for generating a judgment result signal when the acceleration signal is out of the reference range;
    a rear suspension characteristic alteration means for altering a suspension characteristic of the rear suspension when receiving the judgment result signal;
    a vehicle speed detection means for detecting a running speed of the vehicle and for generating a vehicle speed signal; and
    a change means for changing the reference range used in the judgment means according to the vehicle speed signal.

2. A rear suspension controller according to claim 1 wherein:
    the judgment means comprises a means for comparing the acceleration signal with a plurality of predetermined reference ranges and for generating a plurality of judgment result signals according to the comparison results; and
    the rear suspension characteristic alteration means comprises a means for altering the suspension characteristic of the rear suspension into more than three states ('soft', 'sport' and 'hard') according to the judgment result signals.

3. A rear suspension controller according to claim 1 wherein the rear suspension characteristic alteration means comprises a means for altering a spring constant of a rear air suspension.

4. A rear suspension controller according to claim 1 wherein the rear suspension characteristic alteration means comprises a means for altering a damping force of a shock absorber provided to the rear suspension.

* * * * *